US012743350B2

(12) United States Patent
Guim Bernat et al.

(10) Patent No.: US 12,743,350 B2
(45) Date of Patent: Sep. 22, 2026

(54) METHODS AND APPARATUS FOR MAINTAINING THE COOLING SYSTEMS OF DISTRIBUTED COMPUTE SYSTEMS

(71) Applicant: Intel Corporation, Santa Clara, CA (US)

(72) Inventors: Francesc Guim Bernat, Barcelona (ES); Amruta Misra, Bangalore (IN); Arun Hodigere, Bangalore (IN); Kshitij Arun Doshi, Tempe, AZ (US); John J. Browne, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/192,575

(22) Filed: Mar. 29, 2023

(65) Prior Publication Data

US 2023/0244560 A1 Aug. 3, 2023

(30) Foreign Application Priority Data

Dec. 30, 2022 (IN) ............................. 202241077231

(51) Int. Cl.
*G06F 11/20* (2006.01)
*G06F 1/20* (2006.01)
*G06F 11/07* (2006.01)

(52) U.S. Cl.
CPC .............. *G06F 11/203* (2013.01); *G06F 1/20* (2013.01); *G06F 11/0709* (2013.01); *G06F 11/0754* (2013.01); *G06F 11/0793* (2013.01)

(58) Field of Classification Search
CPC ............. G06F 11/0709; G06F 11/0754; G06F 11/0793; G06F 11/2023; G06F 11/2025; G06F 11/2028; G06F 11/203; G06F 11/3006; G06F 11/3055; G06F 1/20; G06F 1/206; G06F 9/5083; G06F 9/5088; G06F 2009/4557; G06F 11/004; G06F 11/008; G06F 11/3058
See application file for complete search history.

(56) References Cited

U.S. PATENT DOCUMENTS 10,120,790 B1 * 11/2018 Varteresian ......... G06F 11/3692
2014/0173130 A1 * 6/2014 Uluderya .............. G06F 9/5044 709/238
2014/0361978 A1 * 12/2014 Malarky ............. G06F 11/3058 345/156

(Continued)

FOREIGN PATENT DOCUMENTS

GB 2576032 4/2021
GB 2576030 12/2021

(Continued)

*Primary Examiner* — Marc Duncan
*Assistant Examiner* — Albert Li
(74) *Attorney, Agent, or Firm* — Hanley, Flight & Zimmerman, LLC

(57) ABSTRACT

Methods and apparatus for maintaining the cooling systems of distributed compute systems are disclosed. An example apparatus disclosed herein includes memory, machine-readable instructions, and processor circuitry to execute the machine-readable instructions to determine a health of a server, determine a threshold based on a workload service level agreement associated with the server, and in response to determining the health does not a satisfy the threshold, throttle a workload on the server.

17 Claims, 22 Drawing Sheets

(56) References Cited

U.S. PATENT DOCUMENTS

| | | | | |
|---|---|---|---|---|
| 2016/0359683 | A1* | 12/2016 | Bartfai-Walcott | H04L 41/40 |
| 2017/0286176 | A1* | 10/2017 | Artman | G06F 9/5027 |
| 2020/0097352 | A1* | 3/2020 | Mahindru | G06F 11/079 |
| 2021/0320050 | A1 | 10/2021 | Robinson et al. | |
| 2021/0349759 | A1* | 11/2021 | Bansal | G06F 9/45558 |
| 2022/0206485 | A1* | 6/2022 | Qadri | G05B 23/0283 |
| 2024/0111643 | A1* | 4/2024 | Sunder | G06F 11/2035 |
| 2024/0126352 | A1* | 4/2024 | Manousakis | G06F 9/5094 |
| 2024/0414238 | A1* | 12/2024 | Zeiger | H04L 67/1034 |

FOREIGN PATENT DOCUMENTS

| | | |
|---|---|---|
| GB | 2597525 | 2/2022 |
| GB | 2601357 | 6/2022 |

* cited by examiner

METHODS AND APPARATUS FOR MAINTAINING THE COOLING SYSTEMS OF DISTRIBUTED COMPUTE SYSTEMS

RELATED APPLICATION

This patent claims priority to Indian Provisional Patent Application No. 202241077231, filed on Dec. 30, 2022 and entitled "METHODS AND APPARATUS FOR MAINTAINING THE COOLING SYSTEMS OF DISTRIBUTED COMPUTE SYSTEMS," which is incorporated herein in its entirety.

FIELD OF THE DISCLOSURE

This disclosure relates generally to compute components and, more particularly, to methods and apparatus for maintaining the cooling systems of distributed compute systems.

BACKGROUND

The use of liquids to cool electronic components is being explored for its benefits over more traditional air cooling systems, as there is an increasing need to address thermal management risks resulting from increased thermal design power in high performance systems (e.g., CPU and/or GPU servers in data centers, cloud computing, edge computing, and the like). More particularly, relative to air, liquid has inherent advantages of higher specific heat (when no boiling is involved) and higher latent heat of vaporization (when boiling is involved).

BRIEF DESCRIPTION OF THE DRAWINGS

In general, the same reference numbers will be used throughout the drawing(s) and accompanying written description to refer to the same or like parts. The figures are not to scale.

Figure 1:
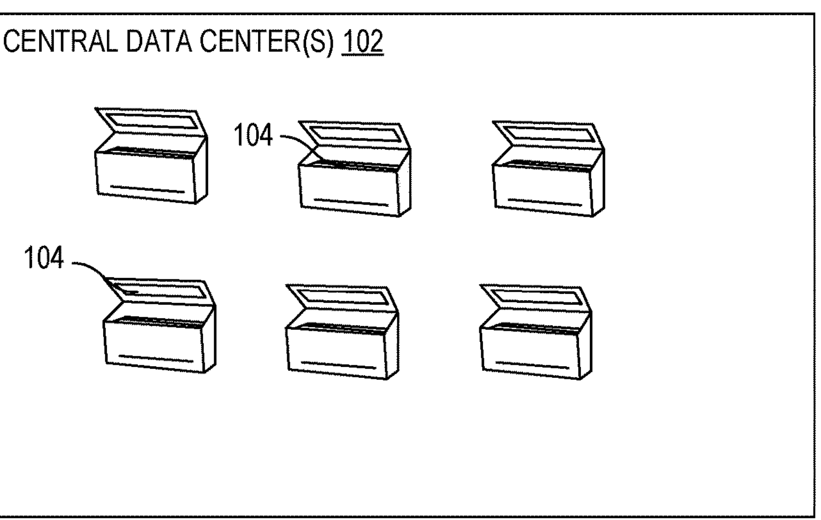
FIG. 1 illustrates one or more example environments in which teachings of this disclosure may be implemented.
Figure 1:
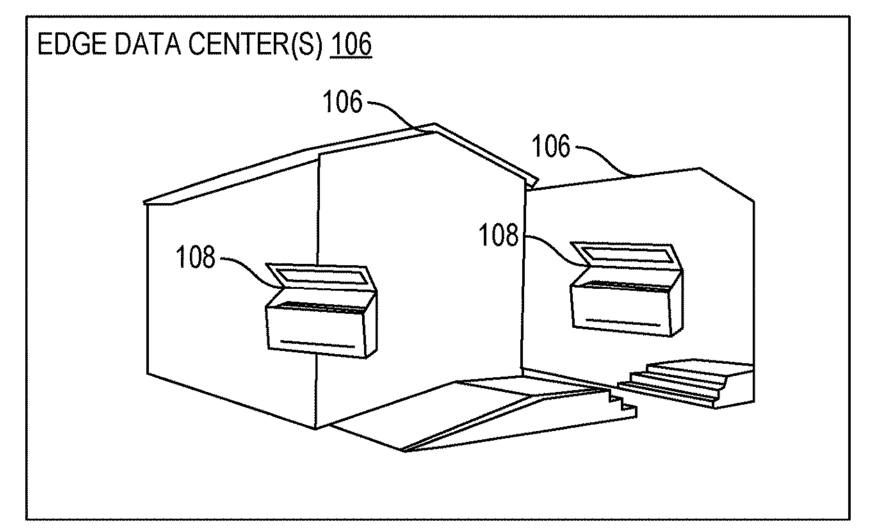
Figure 1:
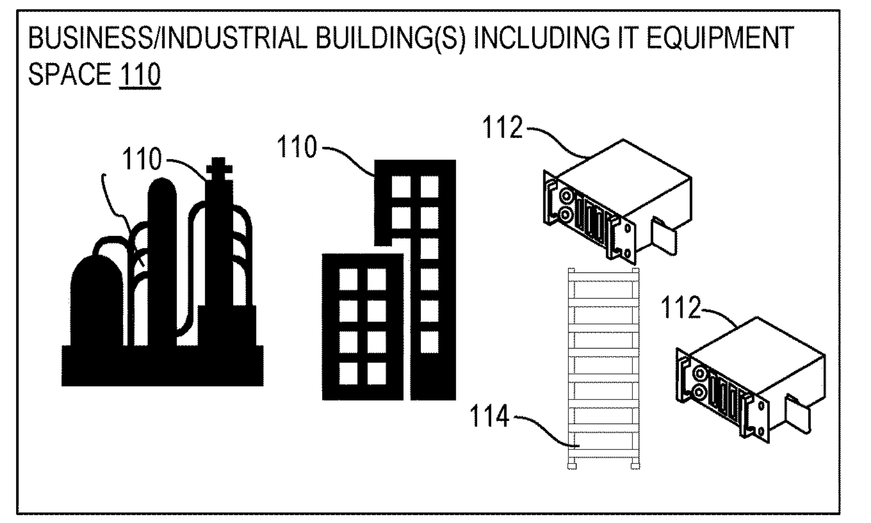
Figure 1:
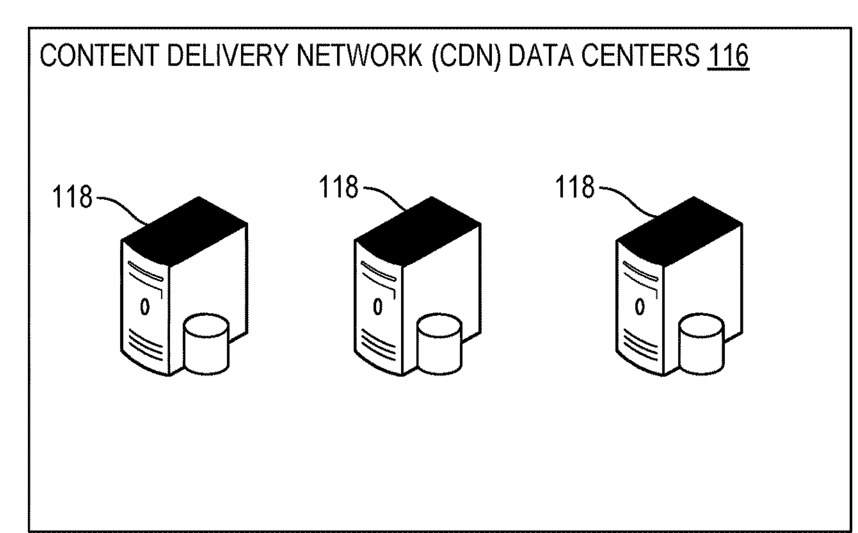

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Liquid cooling systems for cooling electronic components are being explored for their benefits over more traditional air cooling systems, as there are increasing needs to address thermal management risks resulting from increased thermal design power in high performance systems (e.g., CPU and/or GPU servers in data centers, accelerators, artificial intelligence computing, machine learning computing, cloud computing, edge computing, and the like). Relative to air, liquid has inherent advantages of higher specific heat (when no boiling is involved) and higher latent heat of vaporization (when boiling is involved). In some instances, liquid can be used to indirectly cool electronic components by cooling a cold plate that is thermally coupled to the electronic component(s). An alternative approach is to directly immerse electronic components in the cooling liquid. In direct immersion cooling, the liquid can be in direct contact with the electronic components to directly draw away heat from the electronic components. To enable the cooling liquid to be in direct contact with electronic components, the cooling liquid is electrically insulative (e.g., a dielectric liquid).

A liquid cooling system can involve at least one of single-phase cooling or two-phase cooling. As used herein, single-phase cooling (e.g., single-phase immersion cooling) means the cooling fluid (sometimes also referred to herein as cooling liquid or coolant) used to cool electronic components draws heat away from heat sources (e.g., electronic components) without changing phase (e.g., without boiling and becoming vapor). Such cooling fluids are referred to herein as single-phase cooling fluids, liquids, or coolants. By contrast, as used herein, two-phase cooling (e.g., two-phase immersion cooling) means the cooling fluid (in this case, a cooling liquid) vaporizes or boils from the heat generated by the electronic components to be cooled, thereby changing from the liquid phase to the vapor phase. The gaseous vapor may subsequently be condensed back into a liquid (e.g., via a condenser) to again be used in the cooling process. Such cooling fluids are referred to herein as two-phase cooling fluids, liquids, or coolants. Notably, gases (e.g., air) can also be used to cool components and, therefore, may also be referred to as a cooling fluid and/or a coolant. However, indirect cooling and immersion cooling typically involves at least one cooling liquid (which may or may not change to the vapor phase when in use). Example systems, apparatus, and associated methods to improve cooling systems and/or associated cooling processes are disclosed herein.

Telemetry provides for the collection of data (e.g., performance data, operational data, etc.) associated with components (e.g., compute devices such as servers, cooling systems, etc.) of a system architecture that can be used by schedulers, orchestrators, operations support systems, and/or business support systems. For instance, some known cooling systems provide telemetry that indicates the temperature for one or more elements being cooled, a temperature of a coolant, a flow rate of the coolant, and/or other properties of the cooling systems.

Some known cooling systems and compute systems include components that have limited lifespans. For example, some compute components, including processors, memory, mass storage, and network interface controllers, degrade over the prolonged operation and must be replaced to ensure continued operation of the compute system. Similarly, some cooling system components, such as sensors (e.g., thermocouples, etc.), heat pumps, the immersion fluid of a two-phase cooling system, etc., similarly degrade over time and must be replaced/replenished to ensure the continued operation of the cooling system. Other cooling system components, such as the immersion fluid of a single-phase cooling system, gradually reduce in effectiveness over time and can be replaced periodically to increase system efficiency. Accordingly, cooling systems and/or compute systems must be periodically serviced to replace components at the end of their life cycles. During this maintenance period, the compute system is temporarily shutdown so a technician can access the system and replace degraded components.

Some compute systems are located in remote and/or hostile environments. Examples of such remote compute systems include real-time marine monitoring systems, deep Earth industrial devices, high-altitude communication systems, and space-based systems (e.g., components on satellites, etc.) systems. Such systems are typically remotely accessed to schedule and execute workloads, shared by multiple entities, and perform a variety of different workloads/applications. Due to the remoteness of these compute systems, servicing these platforms can be costly and/or hazardous. Additionally, because these remote systems operate critical and/or unique workloads, long periods of downtime due to repeated maintenance and/or component failure are undesirable.

Examples disclosed herein include a system that plans maintenance periods for compute systems and/or cooling systems to reduce (e.g., minimize) system downtime and the number of technician visits. Examples disclosed herein use telemetry data (e.g., an operating temperature of components, etc.) from compute systems and cooling systems and workload service level agreements (SLAs) to determine the health and/or an estimated remaining life of the components of the system(s). In some examples disclosed herein, the maintenance planning system can schedule a maintenance period based on the health of the components. Examples disclosed herein can determine an overall system health (e.g., the overall health of the compute system and the associated cooling system, etc.) and compare that overall system health to one or more thresholds. In some examples disclosed herein, the maintenance planning system can throttle low-priority workloads on the systems and/or migrate high-priority workloads to redundant compute systems to ensure the system remains operational until the planned maintenance period.

FIG. 1 illustrates one or more example environments in which teachings of this disclosure may be implemented. The example environment(s) of FIG. 1 can include one or more central data centers 102. The central data center(s) 102 can store a large number of servers used by, for instance, one or more organizations for data processing, storage, etc. As illustrated in FIG. 1, the central data center(s) 102 include a plurality of immersion tank(s) 104 to facilitate cooling of the servers and/or other electronic components stored at the central data center(s) 102. The immersion tank(s) 104 can provide for single-phase cooling or two-phase cooling.

The example environments of FIG. 1 can be part of an edge computing system. For instance, the example environments of FIG. 1 can include edge data centers or micro-data centers 106. The edge data center(s) 106 can include, for example, data centers located at a base of a cell tower. In some examples, the edge data center(s) 106 are located at or near a top of a cell tower and/or other utility pole. The edge data center(s) 106 include respective housings that store server(s), where the server(s) can be in communication with, for instance, the server(s) stored at the central data center(s) 102, client devices, and/or other computing devices in the edge network. Example housings of the edge data center(s) 106 may include materials that form one or more exterior surfaces that partially or fully protect contents therein, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. As illustrated in FIG. 1, the edge data center(s) 106 can include immersion tank(s) 108 to store server(s) and/or other electronic component(s) located at the edge data center(s) 106.

The example environment(s) of FIG. 1 can include buildings 110 for purposes of business and/or industry that store information technology (IT) equipment in, for example, one or more rooms of the building(s) 110. For example, as represented in FIG. 1, server(s) 112 can be stored with server rack(s) 114 that support the server(s) 112 (e.g., in an opening of slot of the rack 114). In some examples, the server(s) 112 located at the buildings 110 include on-premise server(s) of an edge computing network, where the on-premise server(s) are in communication with remote server(s) (e.g., the server(s) at the edge data center(s) 106) and/or other computing device(s) within an edge network.

The example environment(s) of FIG. 1 include content delivery network (CDN) data center(s) 116. The CDN data center(s) 116 of this example include server(s) 118 that cache content such as images, webpages, videos, etc. accessed via user devices. The server(s) 118 of the CDN data centers 116 can be disposed in immersion cooling tank(s) such as the immersion tanks 104, 108 shown in connection with the data centers 102, 106.

In some instances, the example data centers 102, 106, 116 and/or building(s) 110 of FIG. 1 include servers and/or other electronic components that are cooled independent of immersion tanks (e.g., the immersion tanks 104, 108) and/or an associated immersion cooling system. That is, in some examples, some or all of the servers and/or other electronic components in the data centers 102, 106, 116 and/or building(s) 110 can be cooled by air and/or liquid coolants without immersing the servers and/or other electronic components therein. Thus, in some examples, the immersion tanks 104, 108 of FIG. 1 may be omitted. Further, the example data centers 102, 106, 116 and/or building(s) 110 of FIG. 1 can correspond to, be implemented by, and/or be adaptations of the example data center 200 described in further detail below in connection with FIGS. 2-16.

Although a certain number of cooling tank(s) and other component(s) are shown in the figures, any number of such components may be present. Also, the example cooling data centers and/or other structures or environments disclosed herein are not limited to arrangements of the size that are depicted in FIG. 1. For instance, the structures containing example cooling systems and/or components thereof disclosed herein can be of a size that includes an opening to accommodate service personnel, such as the example data center(s) 106 of FIG. 1, but can also be smaller (e.g., a "doghouse" enclosure). For instance, the structures containing example cooling systems and/or components thereof disclosed herein can be sized such that access (e.g., the only access) to an interior of the structure is a port for service personnel to reach into the structure. In some examples, the structures containing example cooling systems and/or components thereof disclosed herein are sized such that only a tool can reach into the enclosure because the structure may be supported by, for a utility pole or radio tower, or a larger structure.

Figure 2:
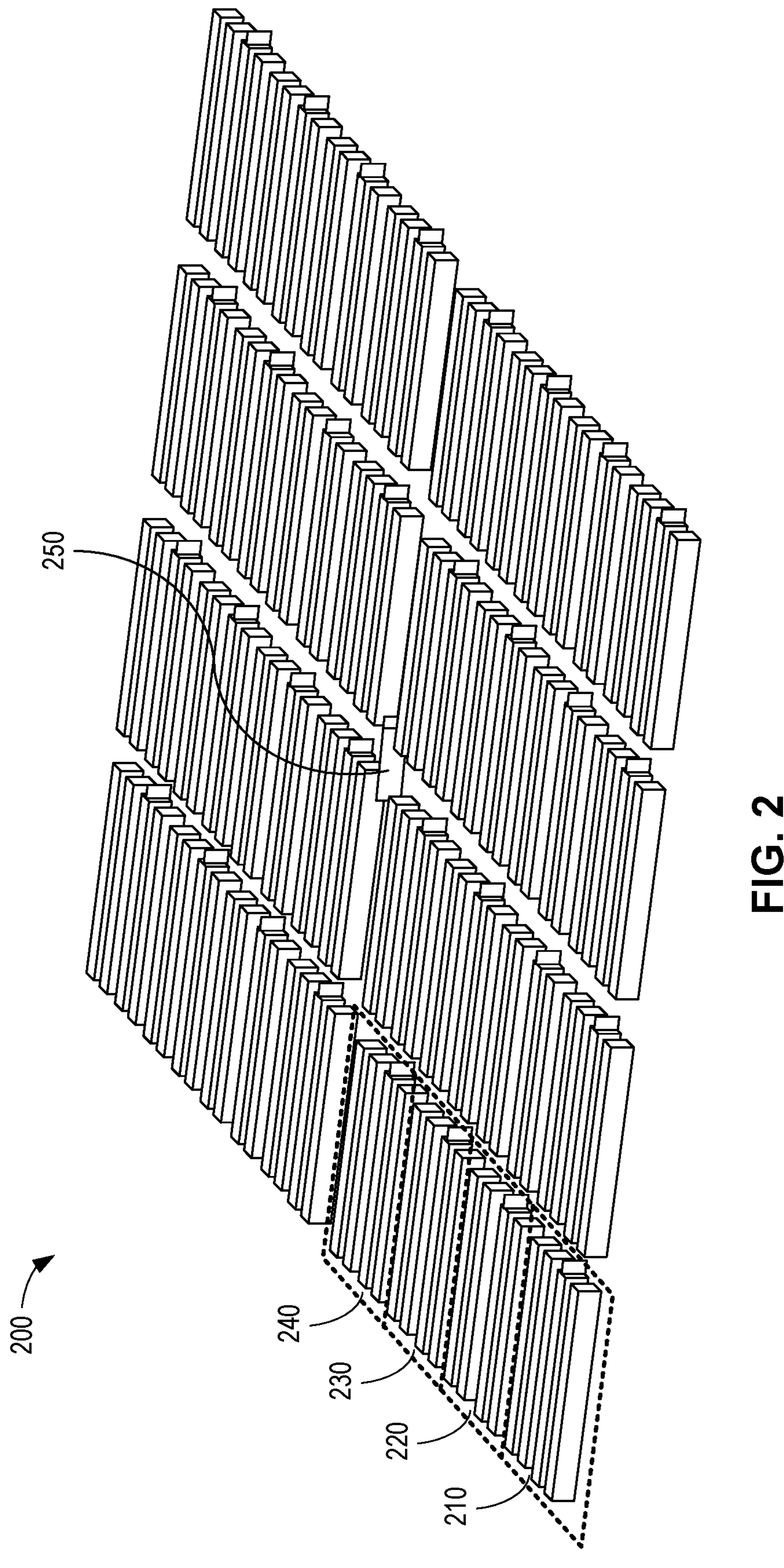
FIG. 2 illustrates at least one example of a data center for executing workloads with disaggregated resources.

FIG. 2 illustrates an example data center 200 in which disaggregated resources may cooperatively execute one or more workloads (e.g., applications on behalf of customers). The illustrated data center 200 includes multiple platforms 210, 220, 230, 240 (referred to herein as pods), each of which includes one or more rows of racks. Although the data center 200 is shown with multiple pods, in some examples, the data center 200 may be implemented as a single pod. As described in more detail herein, a rack may house multiple sleds. A sled may be primarily equipped with a particular type of resource (e.g., memory devices, data storage devices, accelerator devices, general purpose processors), i.e., resources that can be logically coupled to form a composed node. Some such nodes may act as, for example, a server. In the illustrative example, the sleds in the pods 210, 220, 230, 240 are connected to multiple pod switches (e.g., switches that route data communications to and from sleds within the pod). The pod switches, in turn, connect with spine switches 250 that switch communications among pods (e.g., the pods 210, 220, 230, 240) in the data center 200. In some examples, the sleds may be connected with a fabric using Intel Omni-Path™ technology. In other examples, the sleds may be connected with other fabrics, such as InfiniB and or Ethernet. As described in more detail herein, resources within the sleds in the data center 200 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 210, 220, 230, 240. As such, some resources of a single sled may be allocated to one managed node while other resources of the same sled are allocated to a different managed node (e.g., first processor circuitry assigned to one managed node and second processor circuitry of the same sled assigned to a different managed node).

A data center including disaggregated resources, such as the data center 200, can be used in a wide variety of contexts, such as enterprise, government, cloud service provider, and communications service provider (e.g., Telco's), as well in a wide variety of sizes, from cloud service provider mega-data centers that consume over 200,000 sq. ft. to single- or multi-rack installations for use in base stations.

In some examples, the disaggregation of resources is accomplished by using individual sleds that include predominantly a single type of resource (e.g., compute sleds including primarily compute resources, memory sleds including primarily memory resources). The disaggregation of resources in this manner, and the selective allocation and deallocation of the disaggregated resources to form a managed node assigned to execute a workload, improves the operation and resource usage of the data center 200 relative to typical data centers. Such typical data centers include hyperconverged servers containing compute, memory, storage and perhaps additional resources in a single chassis. For example, because a given sled will contain mostly resources of a same particular type, resources of that type can be upgraded independently of other resources. Additionally, because different resource types (processors, storage, accelerators, etc.) typically have different refresh rates, greater resource utilization and reduced total cost of ownership may be achieved. For example, a data center operator can upgrade the processor circuitry throughout a facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 3:
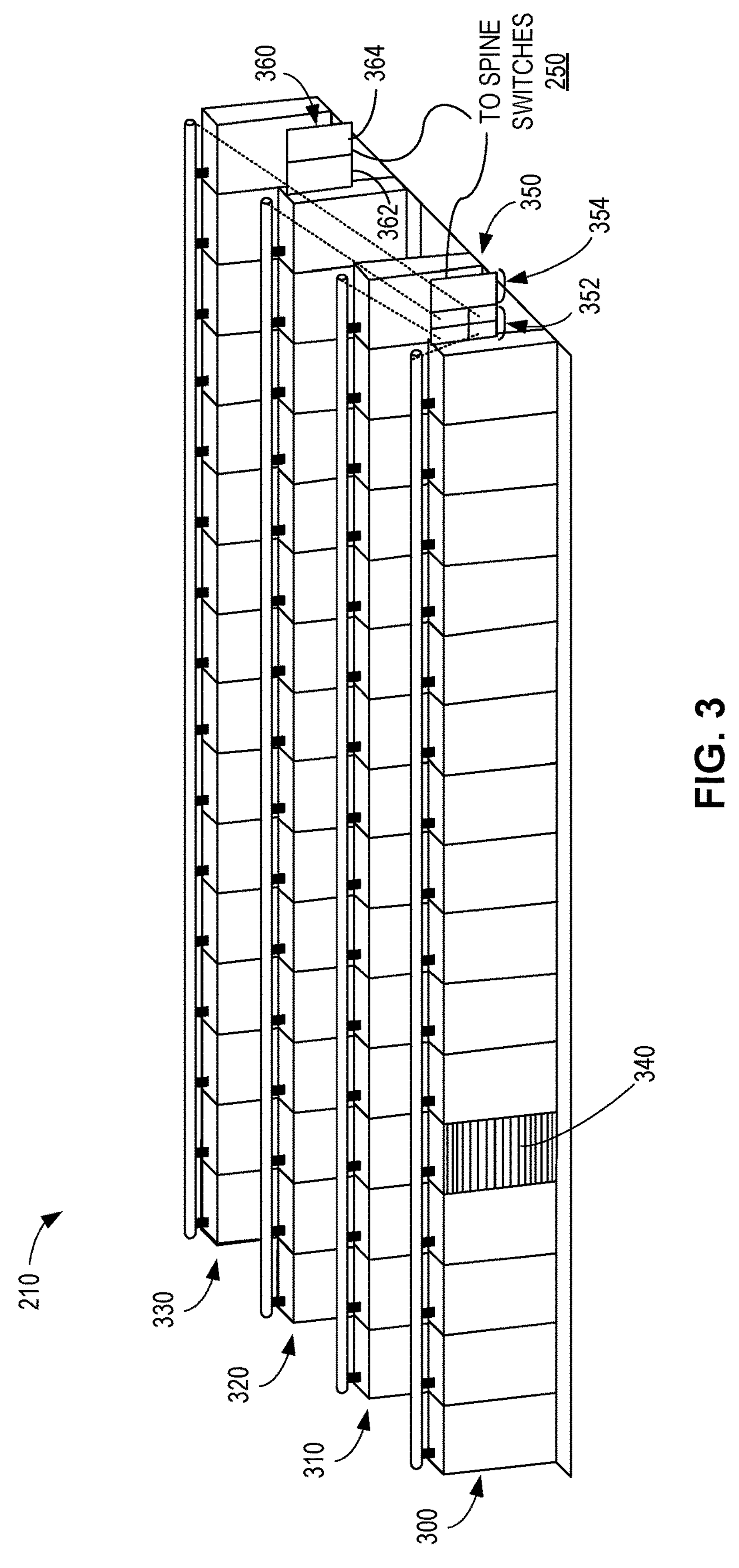
FIG. 3 illustrates at least one example of a pod that may be included in the data center of FIG. 2.

Referring now t to FIG. 3, the pod 210, in the illustrative example, includes a set of rows 300, 310, 320, 330 of racks 340. Individual ones of the racks 340 may house multiple sleds (e.g., sixteen sleds) and provide power and data connections to the housed sleds, as described in more detail herein. In the illustrative example, the racks are connected to multiple pod switches 350, 360. The pod switch 350 includes a set of ports 352 to which the sleds of the racks of the pod 210 are connected and another set of ports 354 that connect the pod 210 to the spine switches 250 to provide connectivity to other pods in the data center 200. Similarly, the pod switch 360 includes a set of ports 362 to which the sleds of the racks of the pod 210 are connected and a set of ports 364 that connect the pod 210 to the spine switches 250. As such, the use of the pair of switches 350, 360 provides an amount of redundancy to the pod 210. For example, if either of the switches 350, 360 fails, the sleds in the pod 210 may still maintain data communication with the remainder of the data center 200 (e.g., sleds of other pods) through the other switch 350, 360. Furthermore, in the illustrative example, the switches 250, 350, 360 may be implemented as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that any one of the other pods 220, 230, 240 (as well as any additional pods of the data center 200) may be similarly structured as, and have components similar to, the pod 210 shown in and disclosed in regard to FIG. 3 (e.g., a given pod may have rows of racks housing multiple sleds as described above). Additionally, while two pod switches 350, 360 are shown, it should be understood that in other examples, a different number of pod switches may be present, providing even more failover capacity. In other examples, pods may be arranged differently than the rows-of-racks configuration shown in FIGS. 2 and 3. For example, a pod may include multiple sets of racks arranged radially, i.e., the racks are equidistant from a center switch.

Figure 4:
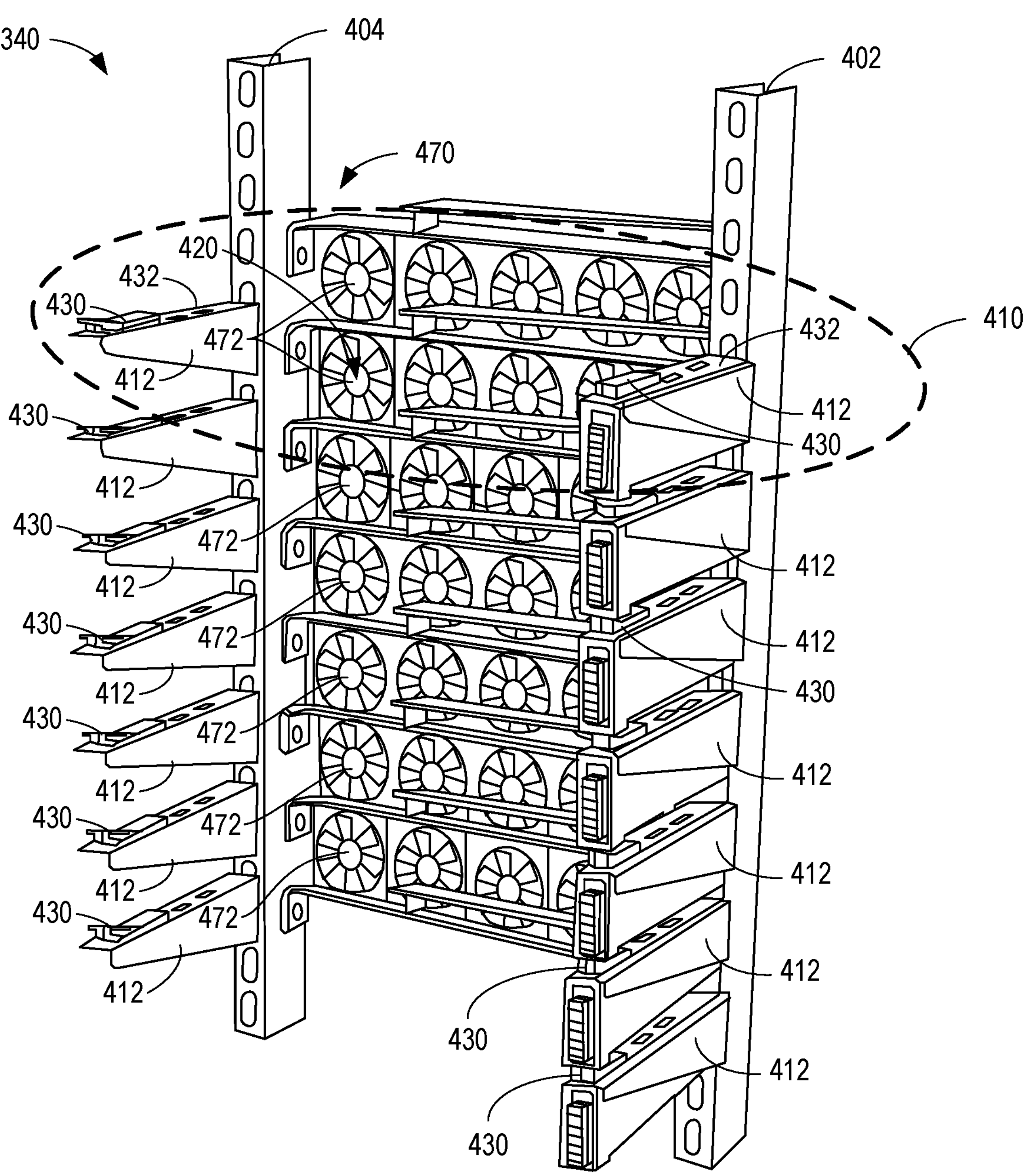
FIG. 4 is a perspective view of at least one example of a rack that may be included in the pod of FIG. 3.
Figure 5:
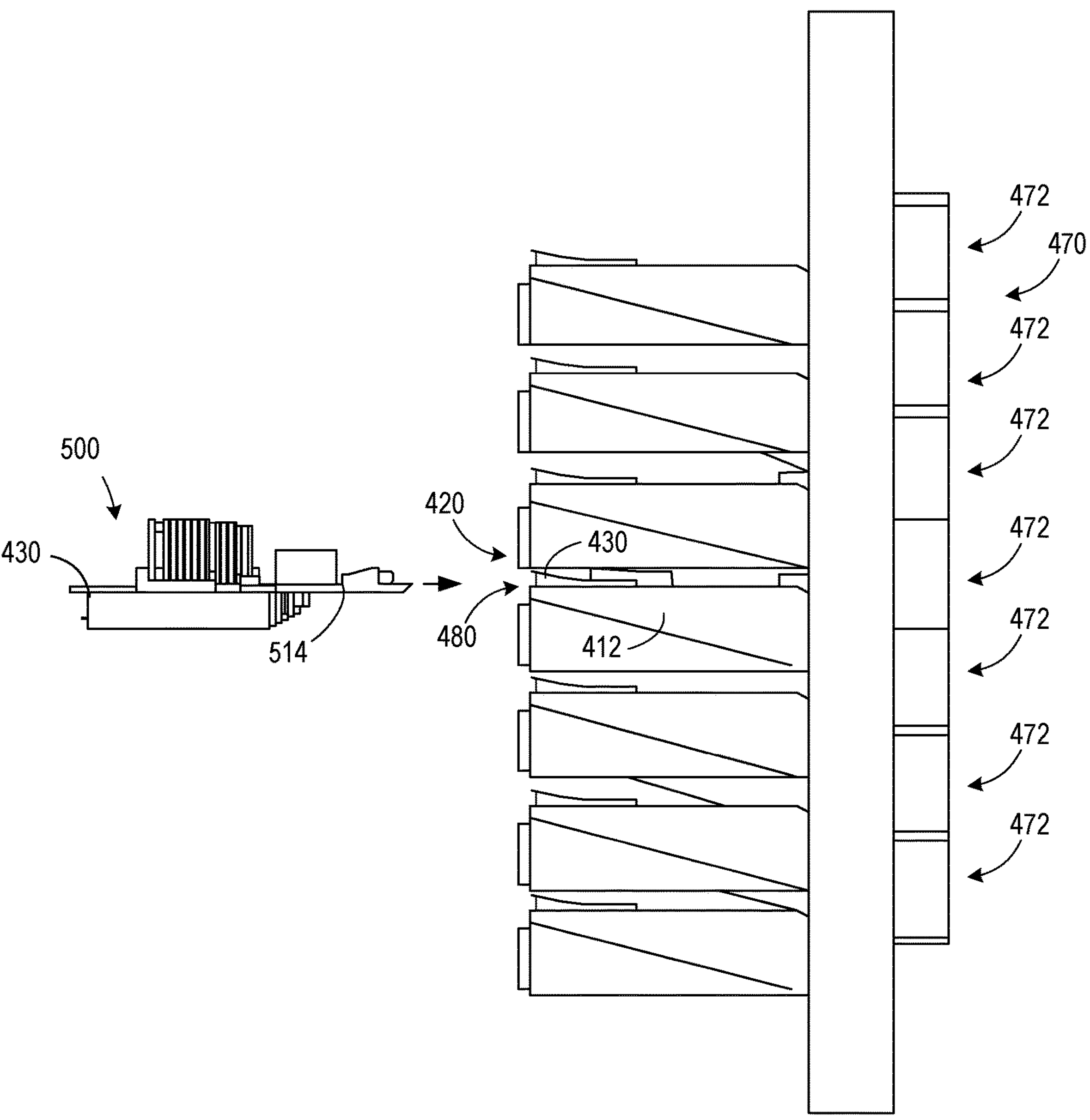
FIG. 5 is a side elevation view of the rack of FIG. 4.
Figure 6:
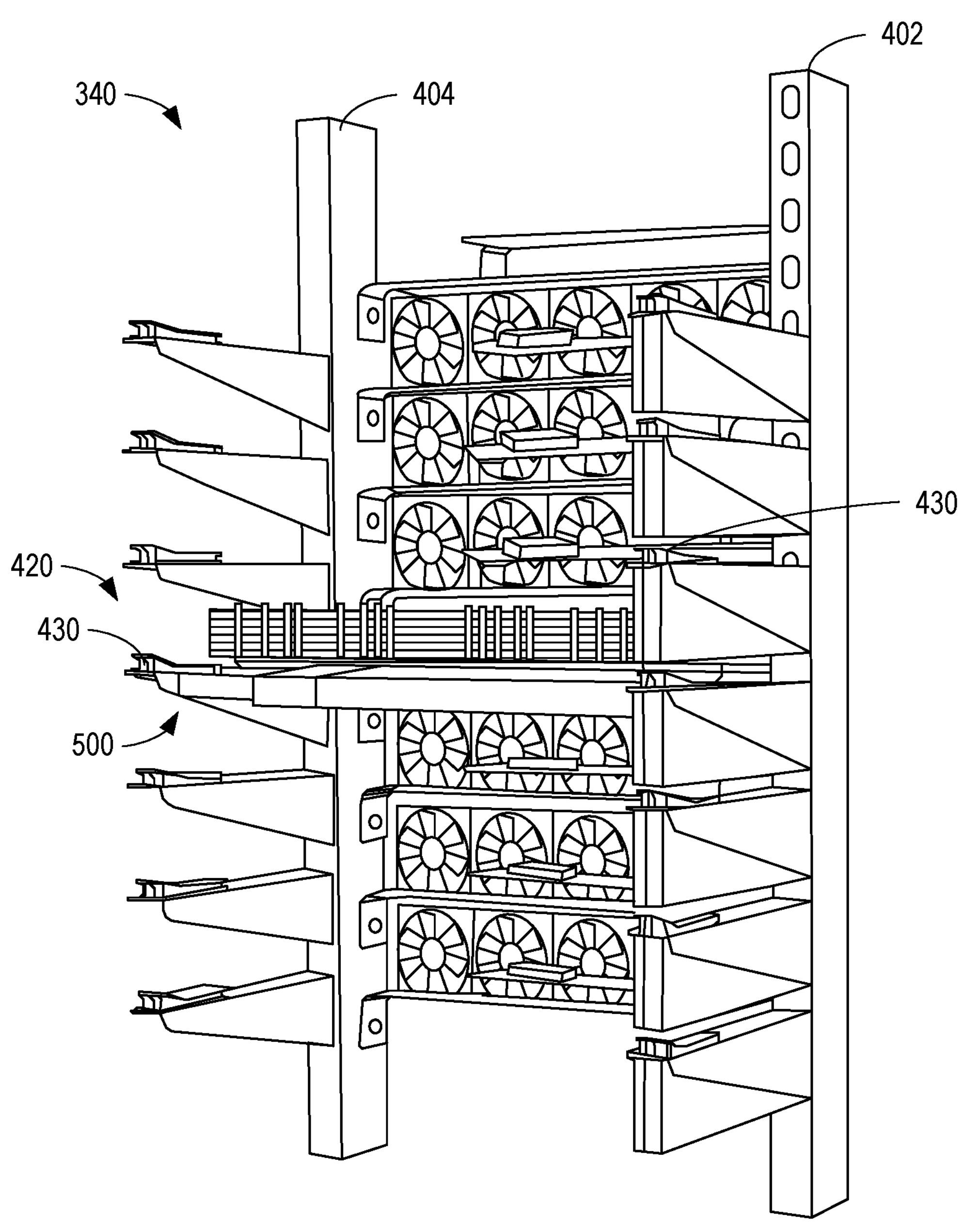
FIG. 6 is a perspective view of the rack of FIG. 4 having a sled mounted therein.

FIGS. 4-6 illustrate an example rack 340 of the data center 200. As shown in the illustrated example, the rack 340 includes two elongated support posts 402, 404, which are arranged vertically. For example, the elongated support posts 402, 404 may extend upwardly from a floor of the data center 200 when deployed. The rack 340 also includes one or more horizontal pairs 410 of elongated support arms 412 (identified in FIG. 4 via a dashed ellipse) configured to support a sled of the data center 200 as discussed below. One elongated support arm 412 of the pair of elongated support arms 412 extends outwardly from the elongated support post 402 and the other elongated support arm 412 extends outwardly from the elongated support post 404.

In the illustrative examples, at least some of the sleds of the data center 200 are chassis-less sleds. That is, such sleds have a chassis-less circuit board substrate on which physical resources (e.g., processors, memory, accelerators, storage, etc.) are mounted as discussed in more detail below. As such, the rack 340 is configured to receive the chassis-less sleds. For example, a given pair 410 of the elongated support arms 412 defines a sled slot 420 of the rack 340, which is configured to receive a corresponding chassis-less sled. To do so, the elongated support arms 412 include corresponding circuit board guides 430 configured to receive the chassis-less circuit board substrate of the sled. The circuit board guides 430 are secured to, or otherwise mounted to, a top side 432 of the corresponding elongated support arms 412. For example, in the illustrative example, the circuit board guides 430 are mounted at a distal end of the corresponding elongated support arm 412 relative to the corresponding elongated support post 402, 404. For clarity of FIGS. 4-6, not every circuit board guide 430 may be referenced in each figure. In some examples, at least some of the sleds include a chassis and the racks 340 are suitably adapted to receive the chassis.

The circuit board guides 430 include an inner wall that defines a circuit board slot 480 configured to receive the chassis-less circuit board substrate of a sled 500 when the sled 500 is received in the corresponding sled slot 420 of the rack 340. To do so, as shown in FIG. 5, a user (or robot) aligns the chassis-less circuit board substrate of an illustrative chassis-less sled 500 to a sled slot 420. The user, or robot, may then slide the chassis-less circuit board substrate forward into the sled slot 420 such that each side edge 514 of the chassis-less circuit board substrate is received in a corresponding circuit board slot 480 of the circuit board guides 430 of the pair 410 of elongated support arms 412 that define the corresponding sled slot 420 as shown in FIG. 5. By having robotically accessible and robotically manipulable sleds including disaggregated resources, the different types of resource can be upgraded independently of one other and at their own optimized refresh rate. Furthermore, the sleds are configured to blindly mate with power and data communication cables in the rack 340, enhancing their ability to be quickly removed, upgraded, reinstalled, and/or replaced. As such, in some examples, the data center 200 may operate (e.g., execute workloads, undergo maintenance and/or upgrades, etc.) without human involvement on the data center floor. In other examples, a human may facilitate one or more maintenance or upgrade operations in the data center 200.

It should be appreciated that the circuit board guides 430 are dual sided. That is, a circuit board guide 430 includes an inner wall that defines a circuit board slot 480 on each side of the circuit board guide 430. In this way, the circuit board guide 430 can support a chassis-less circuit board substrate on either side. As such, a single additional elongated support post may be added to the rack 340 to turn the rack 340 into a two-rack solution that can hold twice as many sled slots 420 as shown in FIG. 4. The illustrative rack 340 includes seven pairs 410 of elongated support arms 412 that define seven corresponding sled slots 420. The sled slots 420 are configured to receive and support a corresponding sled 500 as discussed above. In other examples, the rack 340 may include additional or fewer pairs 410 of elongated support arms 412 (i.e., additional or fewer sled slots 420). It should be appreciated that because the sled 500 is chassis-less, the sled 500 may have an overall height that is different than typical servers. As such, in some examples, the height of a given sled slot 420 may be shorter than the height of a typical server (e.g., shorter than a single rank unit, referred to as "1U"). That is, the vertical distance between pairs 410 of elongated support arms 412 may be less than a standard rack unit "1U." Additionally, due to the relative decrease in height of the sled slots 420, the overall height of the rack 340 in some examples may be shorter than the height of traditional rack enclosures. For example, in some examples, the elongated support posts 402, 404 may have a length of six feet or less. Again, in other examples, the rack 340 may have different dimensions. For example, in some examples, the vertical distance between pairs 410 of elongated support arms 412 may be greater than a standard rack unit "1U". In such examples, the increased vertical distance between the sleds allows for larger heatsinks to be attached to the physical resources and for larger fans to be used (e.g., in the fan array 470 described below) for cooling the sleds, which in turn can allow the physical resources to operate at increased power levels. Further, it should be appreciated that the rack 340 does not include any walls, enclosures, or the like. Rather, the rack 340 is an enclosure-less rack that is opened to the local environment. In some cases, an end plate may be attached to one of the elongated support posts 402, 404 in those situations in which the rack 340 forms an end-of-row rack in the data center 200.

In some examples, various interconnects may be routed upwardly or downwardly through the elongated support posts 402, 404. To facilitate such routing, the elongated support posts 402, 404 include an inner wall that defines an inner chamber in which interconnects may be located. The interconnects routed through the elongated support posts 402, 404 may be implemented as any type of interconnects including, but not limited to, data or communication interconnects to provide communication connections to the sled slots 420, power interconnects to provide power to the sled slots 420, and/or other types of interconnects.

The rack 340, in the illustrative example, includes a support platform on which a corresponding optical data connector (not shown) is mounted. Such optical data connectors are associated with corresponding sled slots 420 and are configured to mate with optical data connectors of corresponding sleds 500 when the sleds 500 are received in the corresponding sled slots 420. In some examples, optical connections between components (e.g., sleds, racks, and switches) in the data center 200 are made with a blind mate optical connection. For example, a door on a given cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 340 also includes a fan array 470 coupled to the cross-support arms of the rack 340. The fan array 470 includes one or more rows of cooling fans 472, which are aligned in a horizontal line between the elongated support posts 402, 404. In the illustrative example, the fan array 470 includes a row of cooling fans 472 for the different sled slots 420 of the rack 340. As discussed above, the sleds 500 do not include any on-board cooling system in the illustrative example and, as such, the fan array 470 provides cooling for such sleds 500 received in the rack 340. In other examples, some or all of the sleds 500 can include on-board cooling systems. Further, in some examples, the sleds 500 and/or the racks 340 may include and/or incorporate a liquid and/or immersion cooling system to facilitate cooling of electronic component(s) on the sleds 500. The rack 340, in the illustrative example, also includes different power supplies associated with different ones of the sled slots 420. A given power supply is secured to one of the elongated support arms 412 of the pair 410 of elongated support arms 412 that define the corresponding sled slot 420. For example, the rack 340 may include a power supply coupled or secured to individual ones of the elongated support arms 412 extending from the elongated support post 402. A given power supply includes a power connector configured to mate with a power connector of a sled 500 when the sled 500 is received in the corresponding sled slot 420. In the illustrative example, the sled 500 does not include any on-board power supply and, as such, the power supplies provided in the rack 340 supply power to corresponding sleds 500 when mounted to the rack 340. A given power supply is configured to satisfy the power requirements for its associated sled, which can differ from sled to sled. Additionally, the power supplies provided in the rack 340 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 7:
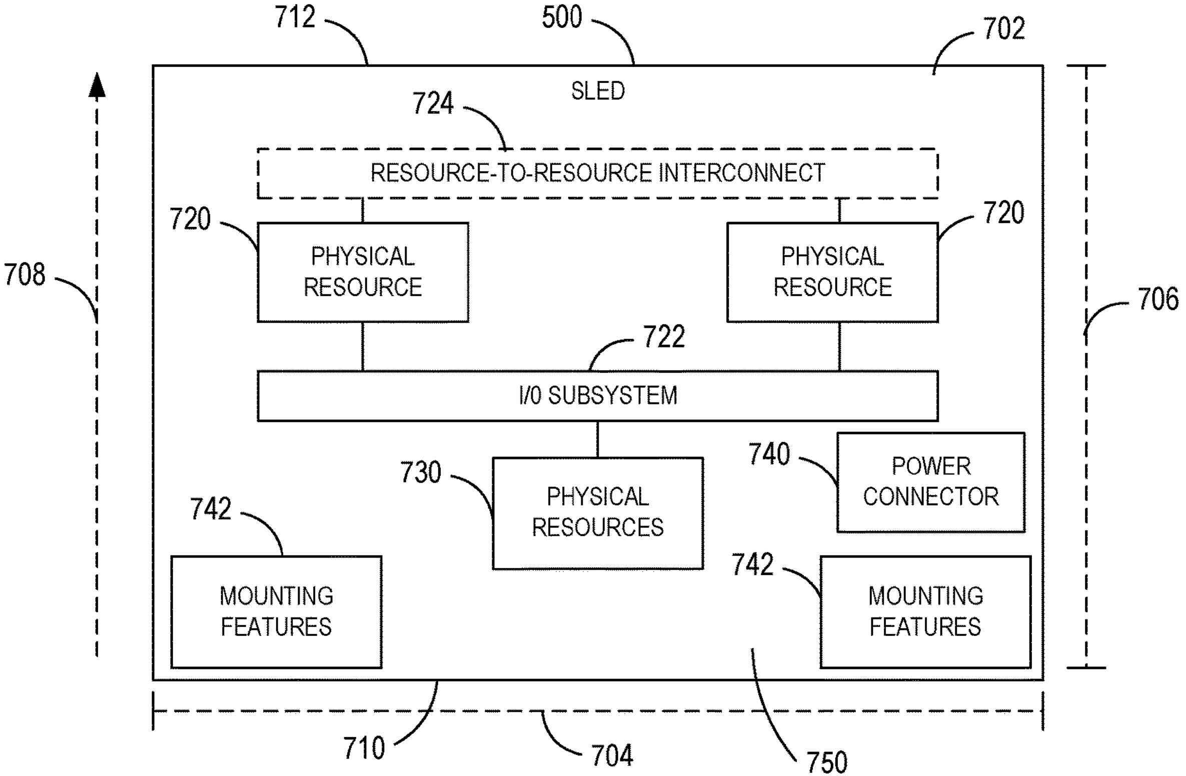
FIG. 7 is a is a block diagram of at least one example of a top side of the sled of FIG. 6.

Referring now to FIG. 7, the sled 500, in the illustrative example, is configured to be mounted in a corresponding rack 340 of the data center 200 as discussed above. In some examples, a given sled 500 may be optimized or otherwise configured for performing particular tasks, such as compute tasks, acceleration tasks, data storage tasks, etc. For example, the sled 500 may be implemented as a compute sled 900 as discussed below in regard to FIGS. 9 and 10, an accelerator sled 1100 as discussed below in regard to FIGS. 11 and 12, a storage sled 1300 as discussed below in regard to FIGS. 13 and 14, or as a sled optimized or otherwise configured to perform other specialized tasks, such as a memory sled 1500, discussed below in regard to FIG. 15.

As discussed above, the illustrative sled 500 includes a chassis-less circuit board substrate 702, which supports various physical resources (e.g., electrical components) mounted thereon. It should be appreciated that the circuit board substrate 702 is "chassis-less" in that the sled 500 does not include a housing or enclosure. Rather, the chassis-less circuit board substrate 702 is open to the local environment. The chassis-less circuit board substrate 702 may be formed from any material capable of supporting the various electrical components mounted thereon. For example, in an illustrative example, the chassis-less circuit board substrate 702 is formed from an FR-4 glass-reinforced epoxy laminate material. Other materials may be used to form the chassis-less circuit board substrate 702 in other examples.

As discussed in more detail below, the chassis-less circuit board substrate 702 includes multiple features that improve the thermal cooling characteristics of the various electrical components mounted on the chassis-less circuit board substrate 702. As discussed, the chassis-less circuit board substrate 702 does not include a housing or enclosure, which may improve the airflow over the electrical components of the sled 500 by reducing those structures that may inhibit air flow. For example, because the chassis-less circuit board substrate 702 is not positioned in an individual housing or enclosure, there is no vertically-arranged backplane (e.g., a back plate of the chassis) attached to the chassis-less circuit board substrate 702, which could inhibit air flow across the electrical components. Additionally, the chassis-less circuit board substrate 702 has a geometric shape configured to reduce the length of the airflow path across the electrical components mounted to the chassis-less circuit board substrate 702. For example, the illustrative chassis-less circuit board substrate 702 has a width 704 that is greater than a depth 706 of the chassis-less circuit board substrate 702. In one particular example, the chassis-less circuit board substrate 702 has a width of about 21 inches and a depth of about 9 inches, compared to a typical server that has a width of about 17 inches and a depth of about 39 inches. As such, an airflow path 708 that extends from a front edge 710 of the chassis-less circuit board substrate 702 toward a rear edge 712 has a shorter distance relative to typical servers, which may improve the thermal cooling characteristics of the sled 500. Furthermore, although not illustrated in FIG. 7, the various physical resources mounted to the chassis-less circuit board substrate 702 in this example are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 702 linearly in-line with each other along the direction of the airflow path 708 (i.e., along a direction extending from the front edge 710 toward the rear edge 712 of the chassis-less circuit board substrate 702). The placement and/or structure of the features may be suitable adapted when the electrical component(s) are being cooled via liquid (e.g., one phase or two phase cooling).

As discussed above, the illustrative sled 500 includes one or more physical resources 720 mounted to a top side 750 of the chassis-less circuit board substrate 702. Although two physical resources 720 are shown in FIG. 7, it should be appreciated that the sled 500 may include one, two, or more physical resources 720 in other examples. The physical resources 720 may be implemented as any type of processor, controller, or other compute circuit capable of performing various tasks such as compute functions and/or controlling the functions of the sled 500 depending on, for example, the type or intended functionality of the sled 500. For example, as discussed in more detail below, the physical resources 720 may be implemented as high-performance processors in examples in which the sled 500 is implemented as a compute sled, as accelerator co-processors or circuits in examples in which the sled 500 is implemented as an accelerator sled, storage controllers in examples in which the sled 500 is implemented as a storage sled, or a set of memory devices in examples in which the sled 500 is implemented as a memory sled.

The sled 500 also includes one or more additional physical resources 730 mounted to the top side 750 of the chassis-less circuit board substrate 702. In the illustrative example, the additional physical resources include a network interface controller (NIC) as discussed in more detail below. Depending on the type and functionality of the sled 500, the physical resources 730 may include additional or other electrical components, circuits, and/or devices in other examples.

The physical resources 720 are communicatively coupled to the physical resources 730 via an input/output (I/O) subsystem 722. The I/O subsystem 722 may be implemented as circuitry and/or components to facilitate input/output operations with the physical resources 720, the physical resources 730, and/or other components of the sled 500. For example, the I/O subsystem 722 may be implemented as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative example, the I/O subsystem 722 is implemented as, or otherwise includes, a double data rate 4 (DDR4) data bus or a DDR5 data bus.

In some examples, the sled 500 may also include a resource-to-resource interconnect 724. The resource-to-resource interconnect 724 may be implemented as any type of communication interconnect capable of facilitating resource-to-resource communications. In the illustrative example, the resource-to-resource interconnect 724 is implemented as a high-speed point-to-point interconnect (e.g., faster than the I/O subsystem 722). For example, the resource-to-resource interconnect 724 may be implemented as a QuickPath Interconnect (QPI), an UltraPath Interconnect (UPI), or other high-speed point-to-point interconnect dedicated to resource-to-resource communications.

The sled 500 also includes a power connector 740 configured to mate with a corresponding power connector of the rack 340 when the sled 500 is mounted in the corresponding rack 340. The sled 500 receives power from a power supply of the rack 340 via the power connector 740 to supply power to the various electrical components of the sled 500. That is, the sled 500 does not include any local power supply (i.e., an on-board power supply) to provide power to the electrical components of the sled 500. The exclusion of a local or on-board power supply facilitates the reduction in the overall footprint of the chassis-less circuit board substrate 702, which may increase the thermal cooling characteristics of the various electrical components mounted on the chassis-less circuit board substrate 702 as discussed above. In some examples, voltage regulators are placed on a bottom side 850 (see FIG. 8) of the chassis-less circuit board substrate 702 directly opposite of processor circuitry 920 (see FIG. 9), and power is routed from the voltage regulators to the processor circuitry 920 by vias extending through the circuit board substrate 702. Such a configuration provides an increased thermal budget, additional current and/or voltage, and better voltage control relative to typical printed circuit boards in which processor power is delivered from a voltage regulator, in part, by printed circuit traces.

In some examples, the sled 500 may also include mounting features 742 configured to mate with a mounting arm, or other structure, of a robot to facilitate the placement of the sled 500 in a rack 340 by the robot. The mounting features 742 may be implemented as any type of physical structures that allow the robot to grasp the sled 500 without damaging the chassis-less circuit board substrate 702 or the electrical components mounted thereto. For example, in some examples, the mounting features 742 may be implemented as non-conductive pads attached to the chassis-less circuit board substrate 702. In other examples, the mounting features may be implemented as brackets, braces, or other similar structures attached to the chassis-less circuit board substrate 702. The particular number, shape, size, and/or make-up of the mounting feature 742 may depend on the design of the robot configured to manage the sled 500.

Figure 8:
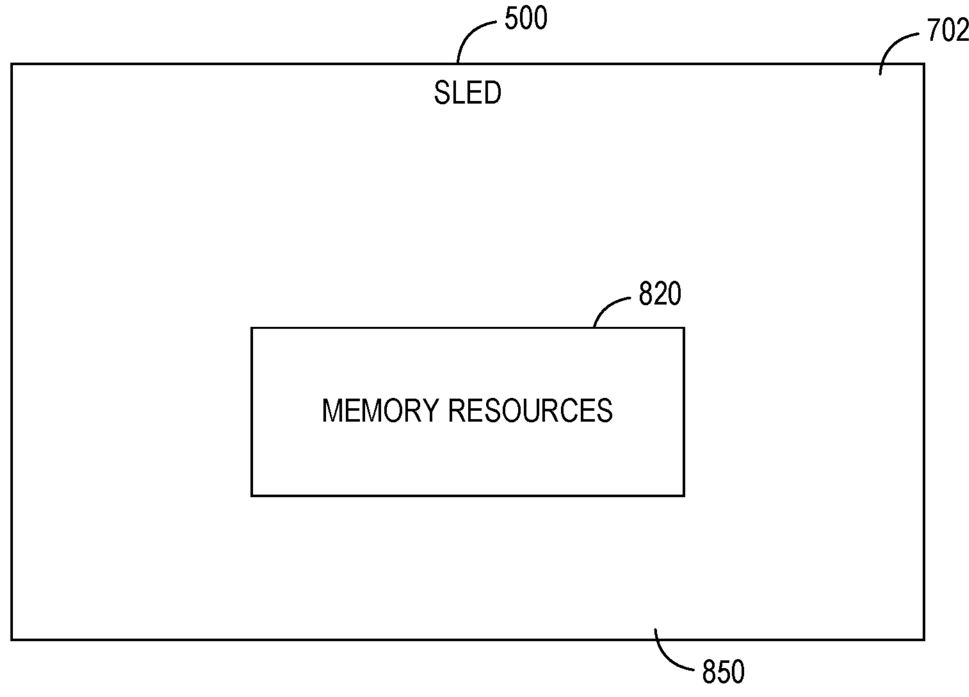
FIG. 8 is a block diagram of at least one example of a bottom side of the sled of FIG. 7.

Referring now to FIG. 8, in addition to the physical resources 730 mounted on the top side 750 of the chassis-less circuit board substrate 702, the sled 500 also includes one or more memory devices 820 mounted to a bottom side 850 of the chassis-less circuit board substrate 702. That is, the chassis-less circuit board substrate 702 is implemented as a double-sided circuit board. The physical resources 720 are communicatively coupled to the memory devices 820 via the I/O subsystem 722. For example, the physical resources 720 and the memory devices 820 may be communicatively coupled by one or more vias extending through the chassis-less circuit board substrate 702. Different ones of the physical resources 720 may be communicatively coupled to different sets of one or more memory devices 820 in some examples. Alternatively, in other examples, different ones of the physical resources 720 may be communicatively coupled to the same ones of the memory devices 820.

The memory devices 820 may be implemented as any type of memory device capable of storing data for the physical resources 720 during operation of the sled 500, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular examples, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one example, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some examples, the memory device may include a transistor-less stackable cross point architecture in which memory cells sit at the intersection of word lines and bit lines and are individually addressable and in which bit storage is based on a change in bulk resistance.

Figure 9:
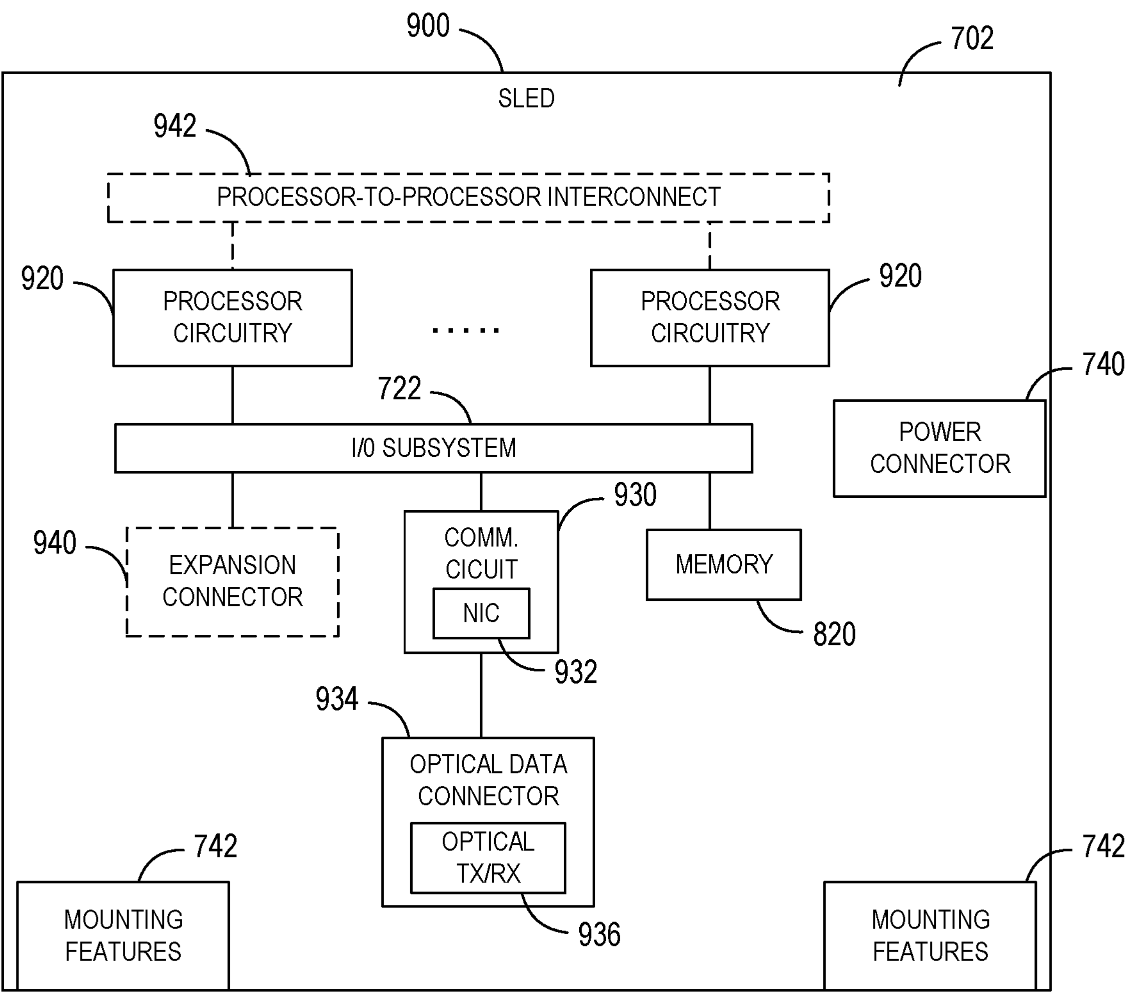
FIG. 9 is a block diagram of at least one example of a compute sled usable in the data center of FIG. 2.

Referring now to FIG. 9, in some examples, the sled 500 may be implemented as a compute sled 900. The compute sled 900 is optimized, or otherwise configured, to perform compute tasks. As discussed above, the compute sled 900 may rely on other sleds, such as acceleration sleds and/or storage sleds, to perform such compute tasks. The compute sled 900 includes various physical resources (e.g., electrical components) similar to the physical resources of the sled 500, which have been identified in FIG. 9 using the same reference numbers. The description of such components provided above in regard to FIGS. 7 and 8 applies to the corresponding components of the compute sled 900 and is not repeated herein for clarity of the description of the compute sled 900.

In the illustrative compute sled 900, the physical resources 720 include processor circuitry 920. Although only two blocks of processor circuitry 920 are shown in FIG. 9, it should be appreciated that the compute sled 900 may include additional processor circuits 920 in other examples. Illustratively, the processor circuitry 920 corresponds to high-performance processors 920 and may be configured to operate at a relatively high power rating. Although the high-performance processor circuitry 920 generates additional heat operating at power ratings greater than typical processors (which operate at around 155-230 W), the enhanced thermal cooling characteristics of the chassis-less circuit board substrate 702 discussed above facilitate the higher power operation. For example, in the illustrative example, the processor circuitry 920 is configured to operate at a power rating of at least 250 W. In some examples, the processor circuitry 920 may be configured to operate at a power rating of at least 350 W.

In some examples, the compute sled 900 may also include a processor-to-processor interconnect 942. Similar to the resource-to-resource interconnect 724 of the sled 500 discussed above, the processor-to-processor interconnect 942 may be implemented as any type of communication interconnect capable of facilitating processor-to-processor interconnect 942 communications. In the illustrative example, the processor-to-processor interconnect 942 is implemented as a high-speed point-to-point interconnect (e.g., faster than the I/O subsystem 722). For example, the processor-to-processor interconnect 942 may be implemented as a QuickPath Interconnect (QPI), an UltraPath Interconnect (UPI), or other high-speed point-to-point interconnect dedicated to processor-to-processor communications.

The compute sled 900 also includes a communication circuit 930. The illustrative communication circuit 930 includes a network interface controller (NIC) 932, which may also be referred to as a host fabric interface (HFI). The NIC 932 may be implemented as, or otherwise include, any type of integrated circuit, discrete circuits, controller chips, chipsets, add-in-boards, daughtercards, network interface cards, or other devices that may be used by the compute sled 900 to connect with another compute device (e.g., with other sleds 500). In some examples, the NIC 932 may be implemented as part of a system-on-a-chip (SoC) that includes one or more processors, or included on a multichip package that also contains one or more processors. In some examples, the NIC 932 may include a local processor (not shown) and/or a local memory (not shown) that are both local to the NIC 932. In such examples, the local processor of the NIC 932 may be capable of performing one or more of the functions of the processor circuitry 920. Additionally or alternatively, in such examples, the local memory of the NIC 932 may be integrated into one or more components of the compute sled at the board level, socket level, chip level, and/or other levels.

The communication circuit 930 is communicatively coupled to an optical data connector 934. The optical data connector 934 is configured to mate with a corresponding optical data connector of the rack 340 when the compute sled 900 is mounted in the rack 340. Illustratively, the optical data connector 934 includes a plurality of optical fibers which lead from a mating surface of the optical data connector 934 to an optical transceiver 936. The optical transceiver 936 is configured to convert incoming optical signals from the rack-side optical data connector to electrical signals and to convert electrical signals to outgoing optical signals to the rack-side optical data connector. Although shown as forming part of the optical data connector 934 in the illustrative example, the optical transceiver 936 may form a portion of the communication circuit 930 in other examples.

In some examples, the compute sled 900 may also include an expansion connector 940. In such examples, the expansion connector 940 is configured to mate with a corresponding connector of an expansion chassis-less circuit board substrate to provide additional physical resources to the compute sled 900. The additional physical resources may be used, for example, by the processor circuitry 920 during operation of the compute sled 900. The expansion chassis-less circuit board substrate may be substantially similar to the chassis-less circuit board substrate 702 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 10:
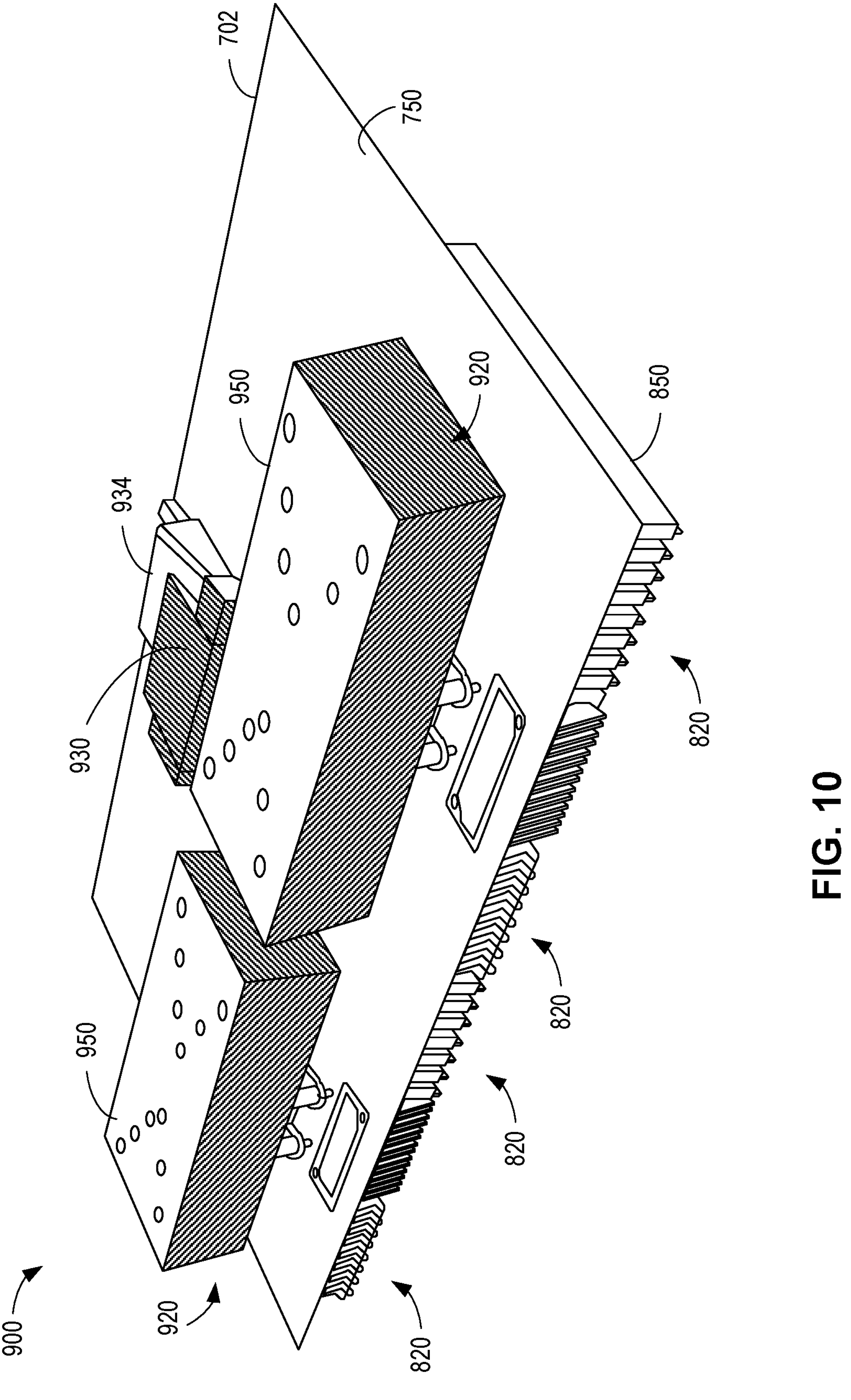
FIG. 10 is a top perspective view of at least one example of the compute sled of FIG. 9.

Referring now to FIG. 10, an illustrative example of the compute sled 900 is shown. As shown, the processor circuitry 920, communication circuit 930, and optical data connector 934 are mounted to the top side 750 of the chassis-less circuit board substrate 702. Any suitable attachment or mounting technology may be used to mount the physical resources of the compute sled 900 to the chassis-less circuit board substrate 702. For example, the various physical resources may be mounted in corresponding sockets (e.g., a processor socket), holders, or brackets. In some cases, some of the electrical components may be directly mounted to the chassis-less circuit board substrate 702 via soldering or similar techniques.

As discussed above, the separate processor circuitry 920 and the communication circuit 930 are mounted to the top side 750 of the chassis-less circuit board substrate 702 such that no two heat-producing, electrical components shadow each other. In the illustrative example, the processor circuitry 920 and the communication circuit 930 are mounted in corresponding locations on the top side 750 of the chassis-less circuit board substrate 702 such that no two of those physical resources are linearly in-line with others along the direction of the airflow path 708. It should be appreciated that, although the optical data connector 934 is in-line with the communication circuit 930, the optical data connector 934 produces no or nominal heat during operation.

The memory devices 820 of the compute sled 900 are mounted to the bottom side 850 of the of the chassis-less circuit board substrate 702 as discussed above in regard to the sled 500. Although mounted to the bottom side 850, the memory devices 820 are communicatively coupled to the processor circuitry 920 located on the top side 750 via the I/O subsystem 722. Because the chassis-less circuit board substrate 702 is implemented as a double-sided circuit board, the memory devices 820 and the processor circuitry 920 may be communicatively coupled by one or more vias, connectors, or other mechanisms extending through the chassis-less circuit board substrate 702. Different processor circuitry 920 (e.g., different processors) may be communicatively coupled to a different set of one or more memory devices 820 in some examples. Alternatively, in other examples, different processor circuitry 920 (e.g., different processors) may be communicatively coupled to the same ones of the memory devices 820. In some examples, the memory devices 820 may be mounted to one or more memory mezzanines on the bottom side of the chassis-less circuit board substrate 702 and may interconnect with a corresponding processor circuitry 920 through a ball-grid array.

Different processor circuitry 920 (e.g., different processors) include and/or is associated with corresponding heatsinks 950 secured thereto. Due to the mounting of the memory devices 820 to the bottom side 850 of the chassis-less circuit board substrate 702 (as well as the vertical spacing of the sleds 500 in the corresponding rack 340), the top side 750 of the chassis-less circuit board substrate 702 includes additional "free" area or space that facilitates the use of heatsinks 950 having a larger size relative to traditional heatsinks used in typical servers. Additionally, due to the improved thermal cooling characteristics of the chassis-less circuit board substrate 702, none of the processor heatsinks 950 include cooling fans attached thereto. That is, the heatsinks 950 may be fan-less heatsinks. In some examples, the heatsinks 950 mounted atop the processor circuitry 920 may overlap with the heatsink attached to the communication circuit 930 in the direction of the airflow path 708 due to their increased size, as illustratively suggested by FIG. 10.

Figure 11:
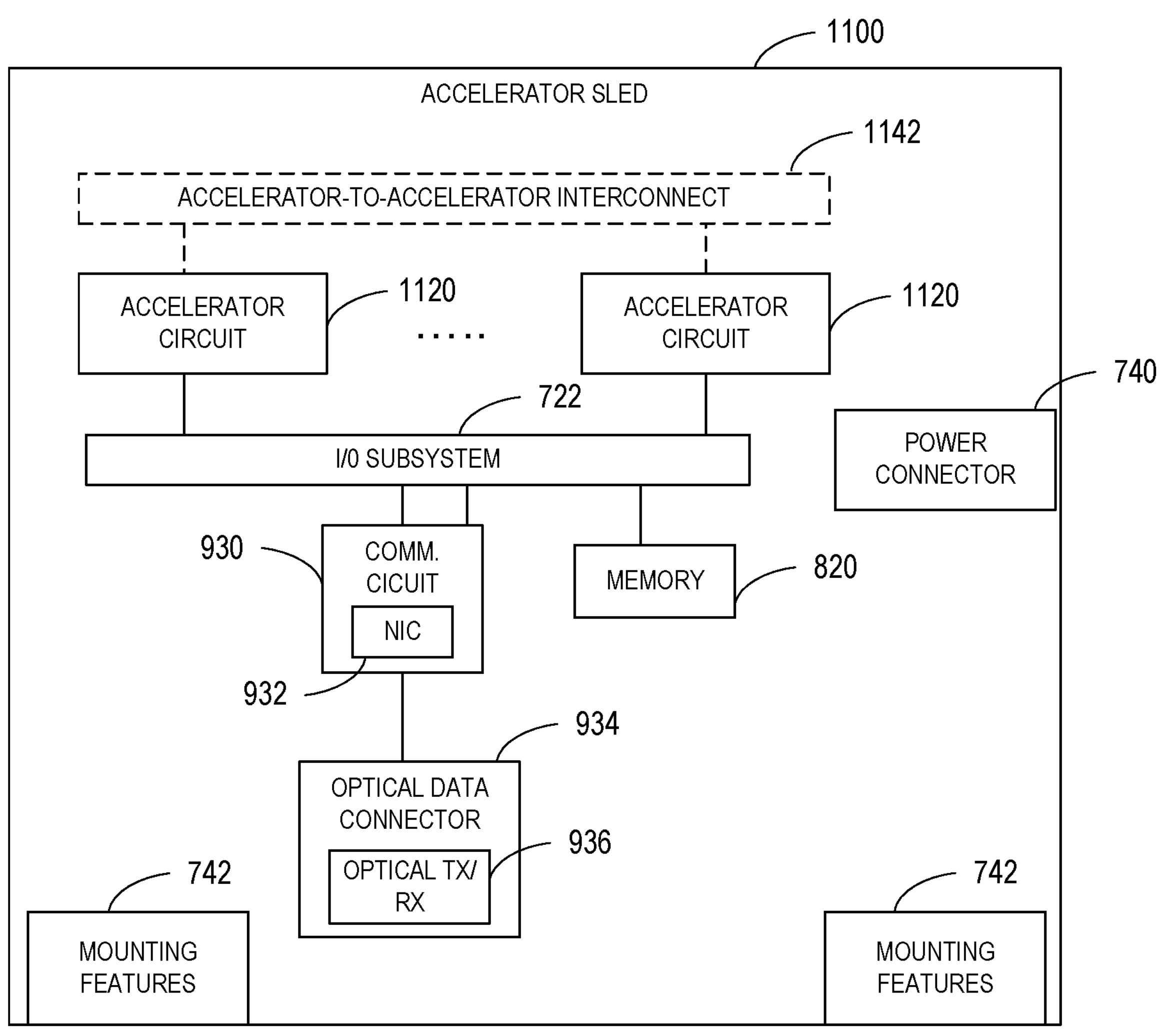
FIG. 11 is a block diagram of at least one example of an accelerator sled usable in the data center of FIG. 2.

Referring now to FIG. 11, in some examples, the sled 500 may be implemented as an accelerator sled 1100. The accelerator sled 1100 is configured, to perform specialized compute tasks, such as machine learning, encryption, hashing, or other computational-intensive task. In some examples, for example, a compute sled 900 may offload tasks to the accelerator sled 1100 during operation. The accelerator sled 1100 includes various components similar to components of the sled 500 and/or the compute sled 900, which have been identified in FIG. 11 using the same reference numbers. The description of such components provided above in regard to FIGS. 7, 8, and 9 apply to the corresponding components of the accelerator sled 1100 and is not repeated herein for clarity of the description of the accelerator sled 1100.

Figure 12:
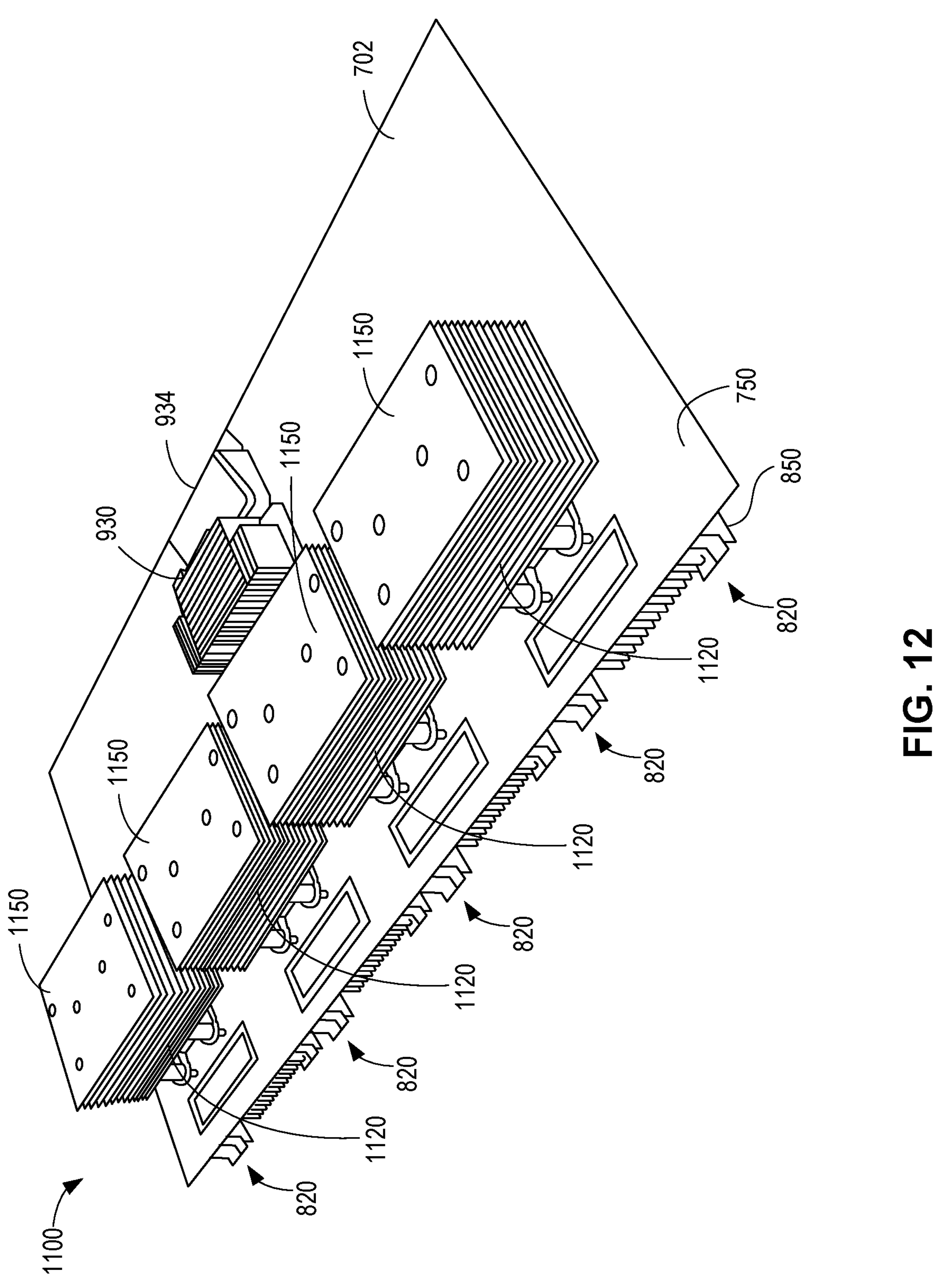
FIG. 12 is a top perspective view of at least one example of the accelerator sled of FIG. 10.

In the illustrative accelerator sled 1100, the physical resources 720 include accelerator circuits 1120. Although only two accelerator circuits 1120 are shown in FIG. 11, it should be appreciated that the accelerator sled 1100 may include additional accelerator circuits 1120 in other examples. For example, as shown in FIG. 12, the accelerator sled 1100 may include four accelerator circuits 1120. The accelerator circuits 1120 may be implemented as any type of processor, co-processor, compute circuit, or other device capable of performing compute or processing operations. For example, the accelerator circuits 1120 may be implemented as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some examples, the accelerator sled 1100 may also include an accelerator-to-accelerator interconnect 1142.

Similar to the resource-to-resource interconnect 724 of the sled 500 discussed above, the accelerator-to-accelerator interconnect 1142 may be implemented as any type of communication interconnect capable of facilitating accelerator-to-accelerator communications. In the illustrative example, the accelerator-to-accelerator interconnect 1142 is implemented as a high-speed point-to-point interconnect (e.g., faster than the I/O subsystem 722). For example, the accelerator-to-accelerator interconnect 1142 may be implemented as a QuickPath Interconnect (QPI), an UltraPath Interconnect (UPI), or other high-speed point-to-point interconnect dedicated to processor-to-processor communications. In some examples, the accelerator circuits 1120 may be daisy-chained with a primary accelerator circuit 1120 connected to the NIC 932 and memory 820 through the I/O subsystem 722 and a secondary accelerator circuit 1120 connected to the NIC 932 and memory 820 through a primary accelerator circuit 1120.

Referring now to FIG. 12, an illustrative example of the accelerator sled 1100 is shown. As discussed above, the accelerator circuits 1120, the communication circuit 930, and the optical data connector 934 are mounted to the top side 750 of the chassis-less circuit board substrate 702. Again, the individual accelerator circuits 1120 and communication circuit 930 are mounted to the top side 750 of the chassis-less circuit board substrate 702 such that no two heat-producing, electrical components shadow each other as discussed above. The memory devices 820 of the accelerator sled 1100 are mounted to the bottom side 850 of the of the chassis-less circuit board substrate 702 as discussed above in regard to the sled 500. Although mounted to the bottom side 850, the memory devices 820 are communicatively coupled to the accelerator circuits 1120 located on the top side 750 via the I/O subsystem 722 (e.g., through vias). Further, the accelerator circuits 1120 may include and/or be associated with a heatsink 1150 that is larger than a traditional heatsink used in a server. As discussed above with reference to the heatsinks 950 of FIG. 9, the heatsinks 1150 may be larger than traditional heatsinks because of the “free” area provided by the memory resources 820 being located on the bottom side 850 of the chassis-less circuit board substrate 702 rather than on the top side 750.

Figure 13:
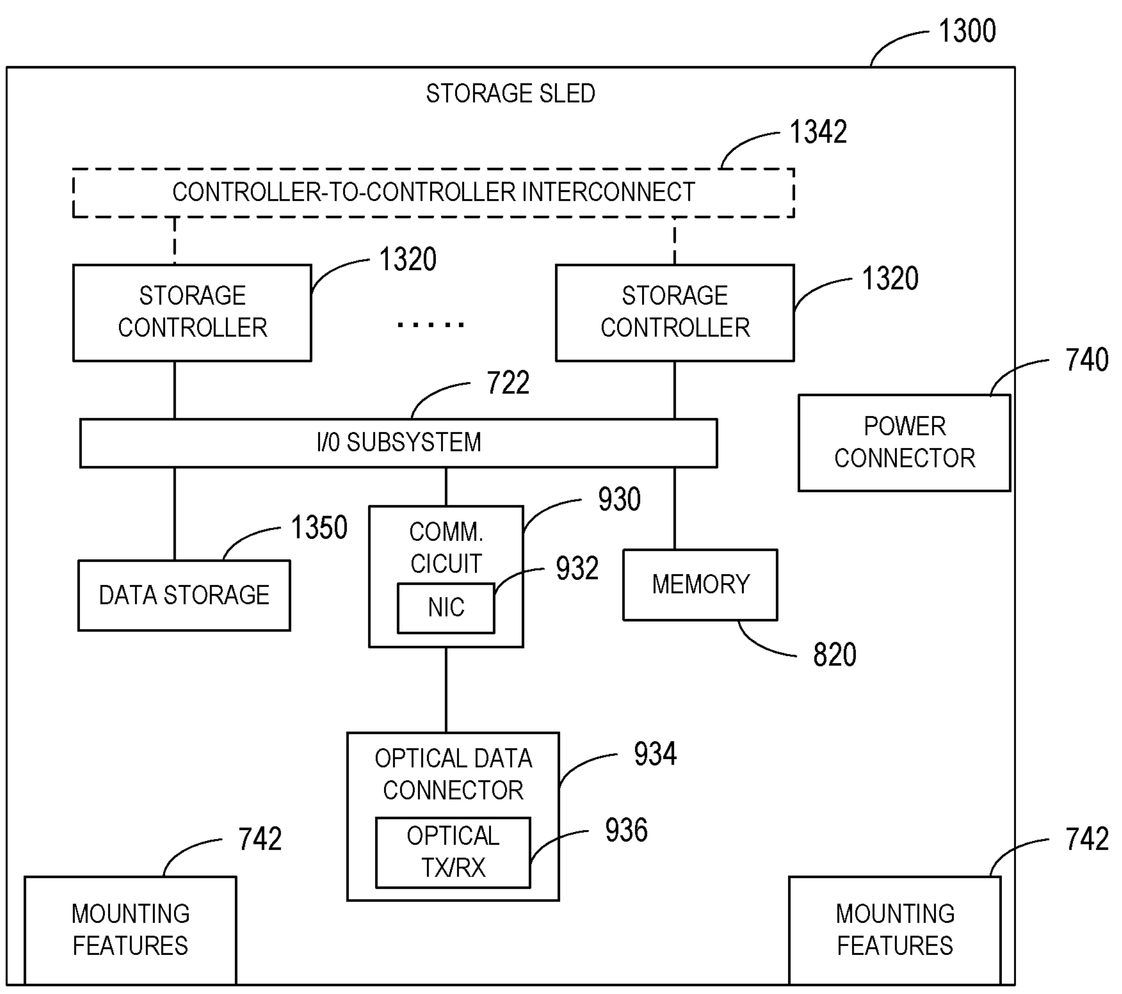
FIG. 13 is a block diagram of at least one example of a storage sled usable in the data center of FIG. 2.

Referring now to FIG. 13, in some examples, the sled 500 may be implemented as a storage sled 1300. The storage sled 1300 is configured, to store data in a data storage 1350 local to the storage sled 1300. For example, during operation, a compute sled 900 or an accelerator sled 1100 may store and retrieve data from the data storage 1350 of the storage sled 1300. The storage sled 1300 includes various components similar to components of the sled 500 and/or the compute sled 900, which have been identified in FIG. 13 using the same reference numbers. The description of such components provided above in regard to FIGS. 7, 8, and 9 apply to the corresponding components of the storage sled 1300 and is not repeated herein for clarity of the description of the storage sled 1300.

In the illustrative storage sled 1300, the physical resources 720 includes storage controllers 1320. Although only two storage controllers 1320 are shown in FIG. 13, it should be appreciated that the storage sled 1300 may include additional storage controllers 1320 in other examples. The storage controllers 1320 may be implemented as any type of processor, controller, or control circuit capable of controlling the storage and retrieval of data into the data storage 1350 based on requests received via the communication circuit 930. In the illustrative example, the storage controllers 1320 are implemented as relatively low-power processors or controllers. For example, in some examples, the storage controllers 1320 may be configured to operate at a power rating of about 75 watts.

In some examples, the storage sled 1300 may also include a controller-to-controller interconnect 1342. Similar to the resource-to-resource interconnect 724 of the sled 500 discussed above, the controller-to-controller interconnect 1342 may be implemented as any type of communication interconnect capable of facilitating controller-to-controller communications. In the illustrative example, the controller-to-controller interconnect 1342 is implemented as a high-speed point-to-point interconnect (e.g., faster than the I/O subsystem 722). For example, the controller-to-controller interconnect 1342 may be implemented as a QuickPath Interconnect (QPI), an UltraPath Interconnect (UPI), or other high-speed point-to-point interconnect dedicated to processor-to-processor communications.

Figure 14:
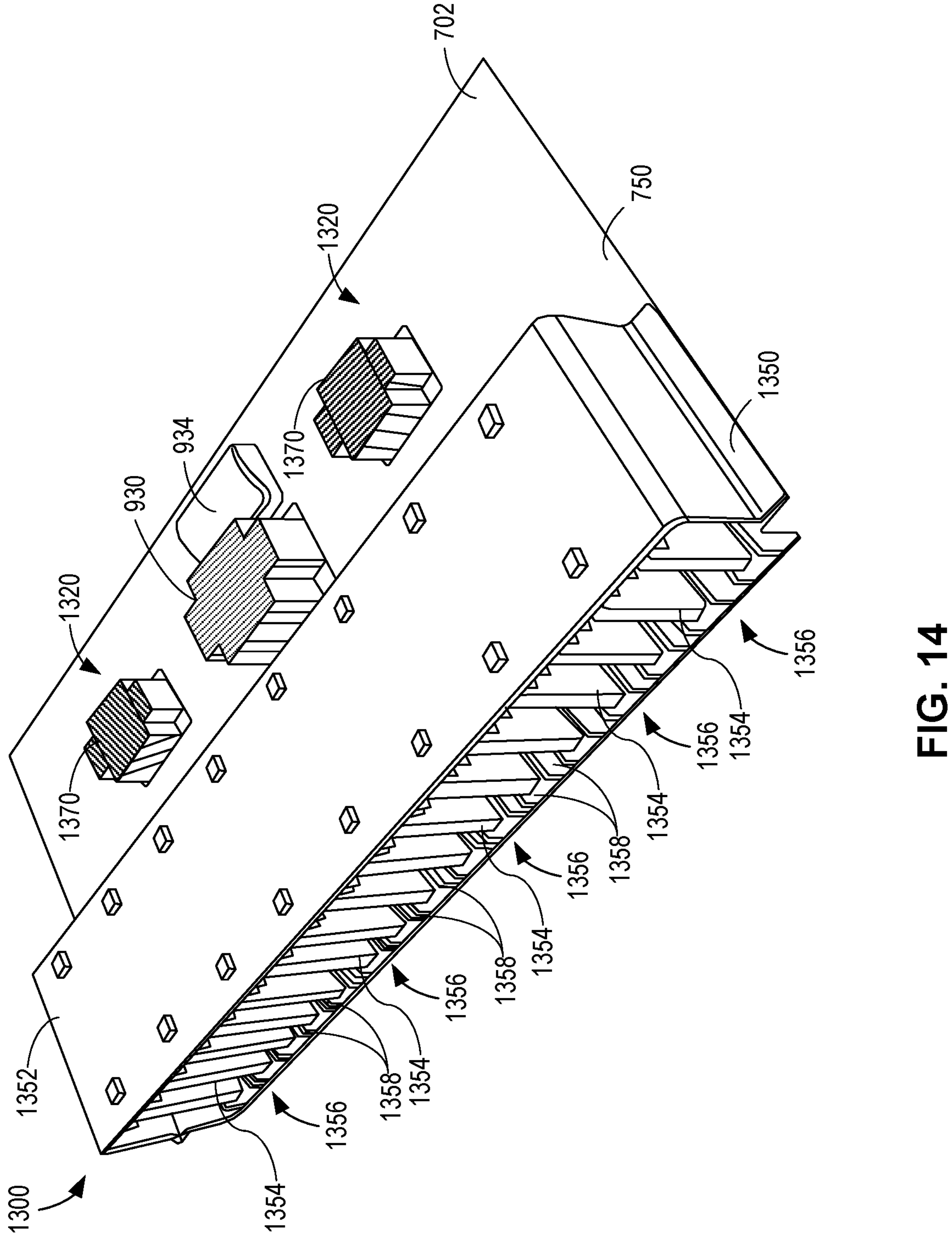
FIG. 14 is a top perspective view of at least one example of the storage sled of FIG. 13.

Referring now to FIG. 14, an illustrative example of the storage sled 1300 is shown. In the illustrative example, the data storage 1350 is implemented as, or otherwise includes, a storage cage 1352 configured to house one or more solid state drives (SSDs) 1354. To do so, the storage cage 1352 includes a number of mounting slots 1356, which are configured to receive corresponding solid state drives 1354. The mounting slots 1356 include a number of drive guides 1358 that cooperate to define an access opening of the corresponding mounting slot 1356. The storage cage 1352 is secured to the chassis-less circuit board substrate 702 such that the access openings face away from (i.e., toward the front of) the chassis-less circuit board substrate 702. As such, solid state drives 1354 are accessible while the storage sled 1300 is mounted in a corresponding rack 340. For example, a solid state drive 1354 may be swapped out of a rack 340 (e.g., via a robot) while the storage sled 1300 remains mounted in the corresponding rack 340.

The storage cage 1352 illustratively includes sixteen mounting slots 1356 and is capable of mounting and storing sixteen solid state drives 1354. The storage cage 1352 may be configured to store additional or fewer solid state drives 1354 in other examples. Additionally, in the illustrative example, the solid state drives are mounted vertically in the storage cage 1352, but may be mounted in the storage cage 1352 in a different orientation in other examples. A given solid state drive 1354 may be implemented as any type of data storage device capable of storing long term data. To do so, the solid state drives 1354 may include volatile and non-volatile memory devices discussed above.

As shown in FIG. 14, the storage controllers 1320, the communication circuit 930, and the optical data connector 934 are illustratively mounted to the top side 750 of the chassis-less circuit board substrate 702. Again, as discussed above, any suitable attachment or mounting technology may be used to mount the electrical components of the storage sled 1300 to the chassis-less circuit board substrate 702 including, for example, sockets (e.g., a processor socket), holders, brackets, soldered connections, and/or other mounting or securing techniques.

As discussed above, the individual storage controllers 1320 and the communication circuit 930 are mounted to the top side 750 of the chassis-less circuit board substrate 702 such that no two heat-producing, electrical components shadow each other. For example, the storage controllers 1320 and the communication circuit 930 are mounted in corresponding locations on the top side 750 of the chassis-less circuit board substrate 702 such that no two of those electrical components are linearly in-line with each other along the direction of the airflow path 708.

The memory devices 820 (not shown in FIG. 14) of the storage sled 1300 are mounted to the bottom side 850 (not shown in FIG. 14) of the chassis-less circuit board substrate 702 as discussed above in regard to the sled 500. Although mounted to the bottom side 850, the memory devices 820 are communicatively coupled to the storage controllers 1320 located on the top side 750 via the I/O subsystem 722. Again, because the chassis-less circuit board substrate 702 is implemented as a double-sided circuit board, the memory devices 820 and the storage controllers 1320 may be communicatively coupled by one or more vias, connectors, or other mechanisms extending through the chassis-less circuit board substrate 702. The storage controllers 1320 include and/or are associated with a heatsink 1370 secured thereto. As discussed above, due to the improved thermal cooling characteristics of the chassis-less circuit board substrate 702 of the storage sled 1300, none of the heatsinks 1370 include cooling fans attached thereto. That is, the heatsinks 1370 may be fan-less heatsinks.

Figure 15:
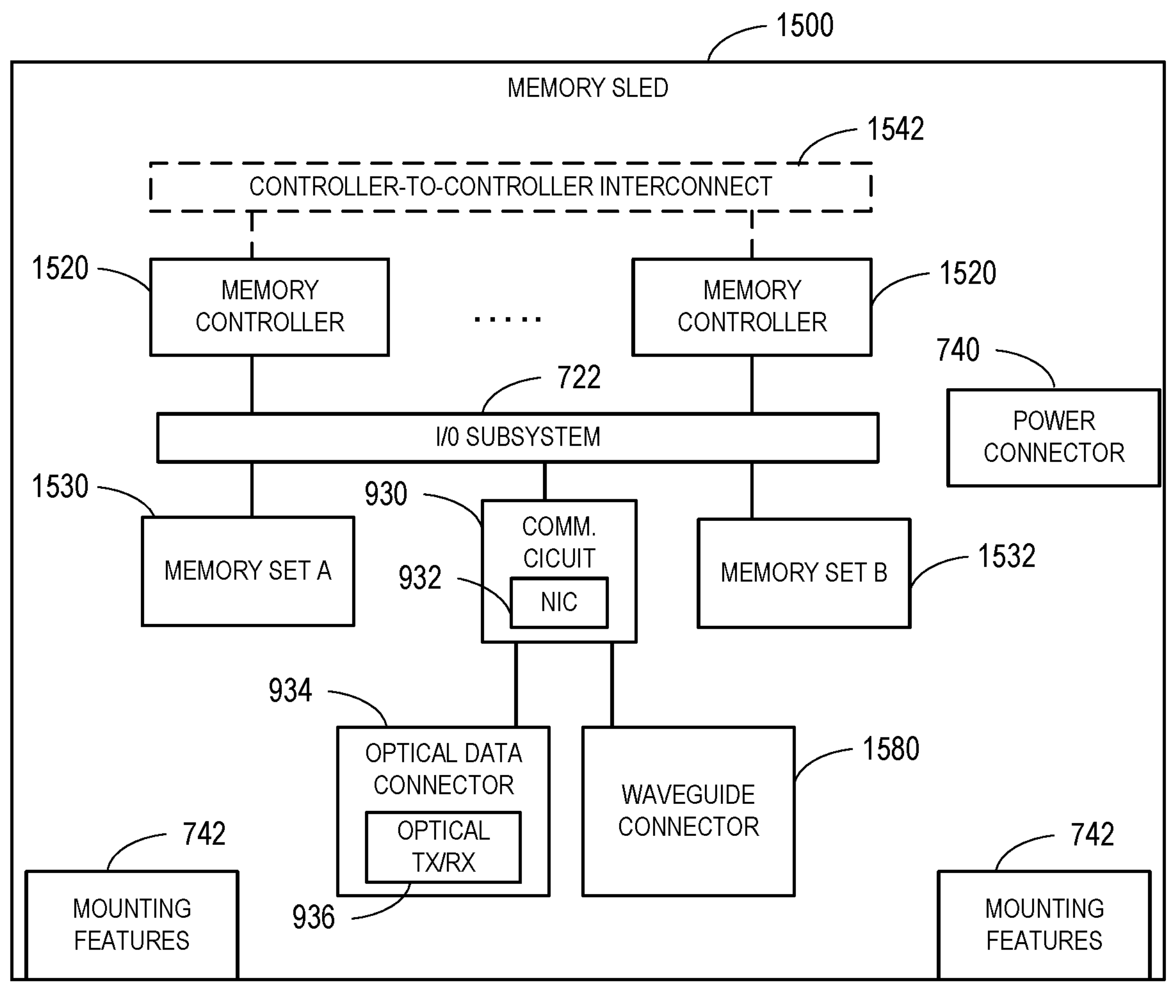
FIG. 15 is a block diagram of at least one example of a memory sled usable in the data center of FIG. 2.

Referring now to FIG. 15, in some examples, the sled 500 may be implemented as a memory sled 1500. The storage sled 1500 is optimized, or otherwise configured, to provide other sleds 500 (e.g., compute sleds 900, accelerator sleds 1100, etc.) with access to a pool of memory (e.g., in two or more sets 1530, 1532 of memory devices 820) local to the memory sled 1300. For example, during operation, a compute sled 900 or an accelerator sled 1100 may remotely write to and/or read from one or more of the memory sets 1530, 1532 of the memory sled 1300 using a logical address space that maps to physical addresses in the memory sets 1530, 1532. The memory sled 1500 includes various components similar to components of the sled 500 and/or the compute sled 900, which have been identified in FIG. 15 using the same reference numbers. The description of such components provided above in regard to FIGS. 7, 8, and 9 apply to the corresponding components of the memory sled 1500 and is not repeated herein for clarity of the description of the memory sled 1500.

In the illustrative memory sled 1500, the physical resources 720 include memory controllers 1520. Although only two memory controllers 1520 are shown in FIG. 15, it should be appreciated that the memory sled 1500 may include additional memory controllers 1520 in other examples. The memory controllers 1520 may be implemented as any type of processor, controller, or control circuit capable of controlling the writing and reading of data into the memory sets 1530, 1532 based on requests received via the communication circuit 930. In the illustrative example, the memory controllers 1520 are connected to corresponding memory sets 1530, 1532 to write to and read from memory devices 820 (not shown) within the corresponding memory set 1530, 1532 and enforce any permissions (e.g., read, write, etc.) associated with sled 500 that has sent a request to the memory sled 1500 to perform a memory access operation (e.g., read or write).

In some examples, the memory sled 1500 may also include a controller-to-controller interconnect 1542. Similar to the resource-to-resource interconnect 724 of the sled 500 discussed above, the controller-to-controller interconnect 1542 may be implemented as any type of communication interconnect capable of facilitating controller-to-controller communications. In the illustrative example, the controller-to-controller interconnect 1542 is implemented as a high-speed point-to-point interconnect (e.g., faster than the I/O subsystem 722). For example, the controller-to-controller interconnect 1542 may be implemented as a QuickPath Interconnect (QPI), an UltraPath Interconnect (UPI), or other high-speed point-to-point interconnect dedicated to processor-to-processor communications. As such, in some examples, a memory controller 1520 may access, through the controller-to-controller interconnect 1542, memory that is within the memory set 1532 associated with another memory controller 1520. In some examples, a scalable memory controller is made of multiple smaller memory controllers, referred to herein as "chiplets", on a memory sled (e.g., the memory sled 1500). The chiplets may be interconnected (e.g., using EMIB (Embedded Multi-Die Interconnect Bridge) technology). The combined chiplet memory controller may scale up to a relatively large number of memory controllers and I/O ports, (e.g., up to 16 memory channels). In some examples, the memory controllers 1520 may implement a memory interleave (e.g., one memory address is mapped to the memory set 1530, the next memory address is mapped to the memory set 1532, and the third address is mapped to the memory set 1530, etc.). The interleaving may be managed within the memory controllers 1520, or from CPU sockets (e.g., of the compute sled 900) across network links to the memory sets 1530, 1532, and may improve the latency associated with performing memory access operations as compared to accessing contiguous memory addresses from the same memory device.

Further, in some examples, the memory sled 1500 may be connected to one or more other sleds 500 (e.g., in the same rack 340 or an adjacent rack 340) through a waveguide, using the waveguide connector 1580. In the illustrative example, the waveguides are 74 millimeter waveguides that provide 16 Rx (i.e., receive) lanes and 16 Tx (i.e., transmit) lanes. Different ones of the lanes, in the illustrative example, are either 16 GHz or 32 GHz. In other examples, the frequencies may be different. Using a waveguide may provide high throughput access to the memory pool (e.g., the memory sets 1530, 1532) to another sled (e.g., a sled 500 in the same rack 340 or an adjacent rack 340 as the memory sled 1500) without adding to the load on the optical data connector 934.

Figure 16:
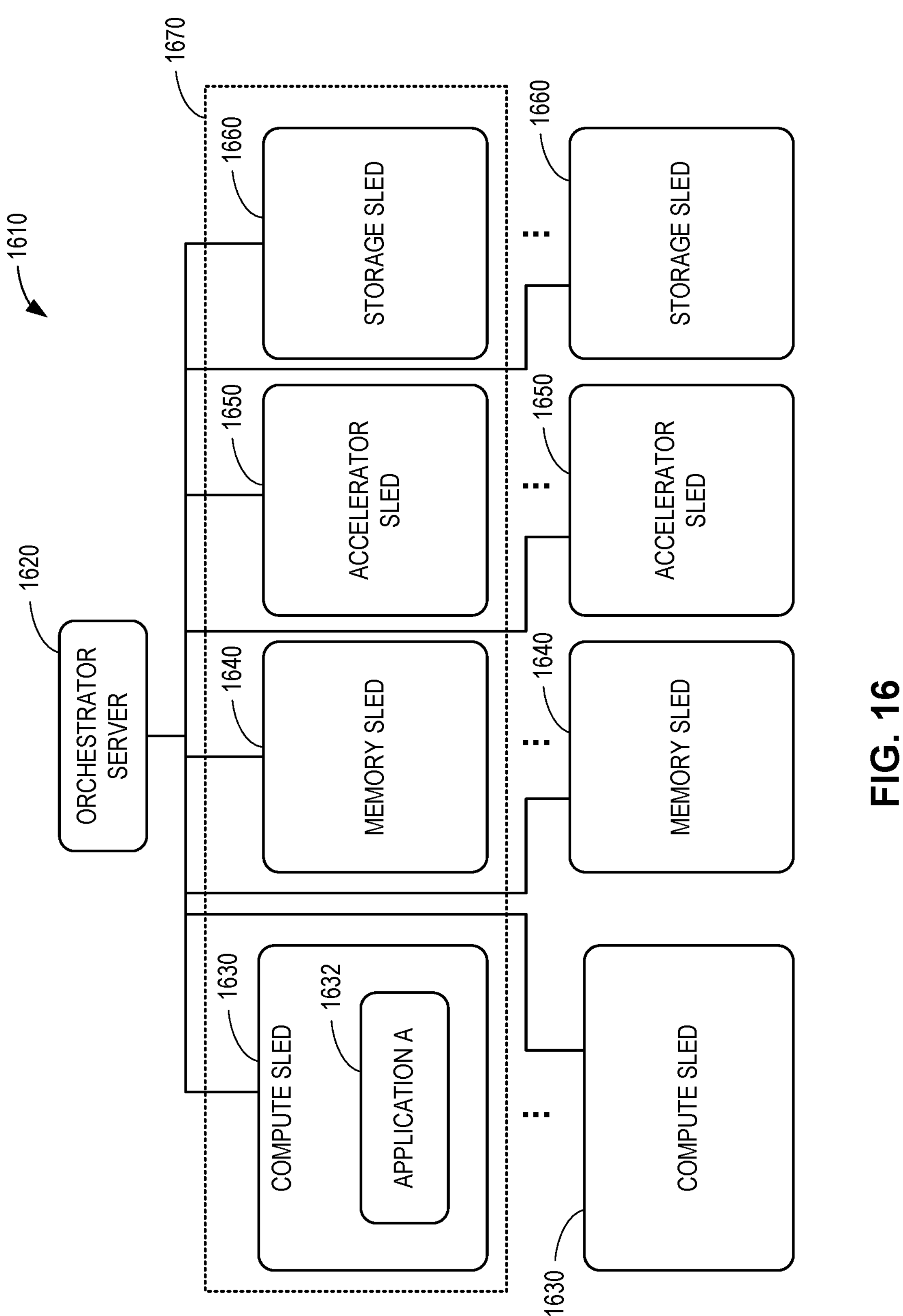
FIG. 16 is a block diagram of a system that may be established within the data center of FIG. 2 to execute workloads with managed nodes of disaggregated resources.

Referring now to FIG. 16, a system for executing one or more workloads (e.g., applications) may be implemented in accordance with the data center 200. In the illustrative example, the system 1610 includes an orchestrator server 1620, which may be implemented as a managed node including a compute device (e.g., processor circuitry 920 on a compute sled 900) executing management software (e.g., a cloud operating environment, such as OpenStack) that is communicatively coupled to multiple sleds 500 including a large number of compute sleds 1630 (e.g., similar to the compute sled 900), memory sleds 1640 (e.g., similar to the memory sled 1500), accelerator sleds 1650 (e.g., similar to the memory sled 1500), and storage sleds 1660 (e.g., similar to the storage sled 1300). One or more of the sleds 1630, 1640, 1650, 1660 may be grouped into a managed node 1670, such as by the orchestrator server 1620, to collectively perform a workload (e.g., an application 1632 executed in a virtual machine or in a container). The managed node 1670 may be implemented as an assembly of physical resources 720, such as processor circuitry 920, memory resources 820, accelerator circuits 1120, or data storage 1350, from the same or different sleds 500. Further, the managed node may be established, defined, or "spun up" by the orchestrator server 1620 at the time a workload is to be assigned to the managed node or at any other time, and may exist regardless of whether any workloads are presently assigned to the managed node. In the illustrative example, the orchestrator server 1620 may selectively allocate and/or deallocate physical resources 720 from the sleds 500 and/or add or remove one or more sleds 500 from the managed node 1670 as a function of quality of service (QoS) targets (e.g., a target throughput, a target latency, a target number of instructions per second, etc.) associated with a service level agreement for the workload (e.g., the application 1632). In doing so, the orchestrator server 1620 may receive telemetry data indicative of performance conditions (e.g., throughput, latency, instructions per second, etc.) in different ones of the sleds 500 of the managed node 1670 and compare the telemetry data to the quality of service targets to determine whether the quality of service targets are being satisfied. The orchestrator server 1620 may additionally determine whether one or more physical resources may be deallocated from the managed node 1670 while still satisfying the QoS targets, thereby freeing up those physical resources for use in another managed node (e.g., to execute a different workload). Alternatively, if the QoS targets are not presently satisfied, the orchestrator server 1620 may determine to dynamically allocate additional physical resources to assist in the execution of the workload (e.g., the application 1632) while the workload is executing. Similarly, the orchestrator server 1620 may determine to dynamically deallocate physical resources from a managed node if the orchestrator server 1620 determines that deallocating the physical resource would result in QoS targets still being met.

Additionally, in some examples, the orchestrator server 1620 may identify trends in the resource utilization of the workload (e.g., the application 1632), such as by identifying phases of execution (e.g., time periods in which different operations, having different resource utilizations characteristics, are performed) of the workload (e.g., the application 1632) and pre-emptively identifying available resources in the data center 200 and allocating them to the managed node 1670 (e.g., within a predefined time period of the associated phase beginning). In some examples, the orchestrator server 1620 may model performance based on various latencies and a distribution scheme to place workloads among compute sleds and other resources (e.g., accelerator sleds, memory sleds, storage sleds) in the data center 200. For example, the orchestrator server 1620 may utilize a model that accounts for the performance of resources on the sleds 500 (e.g., FPGA performance, memory access latency, etc.) and the performance (e.g., congestion, latency, bandwidth) of the path through the network to the resource (e.g., FPGA). As such, the orchestrator server 1620 may determine which resource(s) should be used with which workloads based on the total latency associated with different potential resource(s) available in the data center 200 (e.g., the latency associated with the performance of the resource itself in addition to the latency associated with the path through the network between the compute sled executing the workload and the sled 500 on which the resource is located).

In some examples, the orchestrator server 1620 may generate a map of heat generation in the data center 200 using telemetry data (e.g., temperatures, fan speeds, etc.) reported from the sleds 500 and allocate resources to managed nodes as a function of the map of heat generation and predicted heat generation associated with different workloads, to maintain a target temperature and heat distribution in the data center 200. Additionally or alternatively, in some examples, the orchestrator server 1620 may organize received telemetry data into a hierarchical model that is indicative of a relationship between the managed nodes (e.g., a spatial relationship such as the physical locations of the resources of the managed nodes within the data center 200 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1620 may determine the differences based on the telemetry data stored in the hierarchical model and factor the differences into a prediction of future resource utilization of a workload if the workload is reassigned from one managed node to another managed node, to accurately balance resource utilization in the data center 200. In some examples, the orchestrator server 1620 may identify patterns in resource utilization phases of the workloads and use the patterns to predict future resource utilization of the workloads.

To reduce the computational load on the orchestrator server 1620 and the data transfer load on the network, in some examples, the orchestrator server 1620 may send self-test information to the sleds 500 to enable a given sled 500 to locally (e.g., on the sled 500) determine whether telemetry data generated by the sled 500 satisfies one or more conditions (e.g., an available capacity that satisfies a predefined threshold, a temperature that satisfies a predefined threshold, etc.). The given sled 500 may then report back a simplified result (e.g., yes or no) to the orchestrator server 1620, which the orchestrator server 1620 may utilize in determining the allocation of resources to managed nodes.

Figure 17:
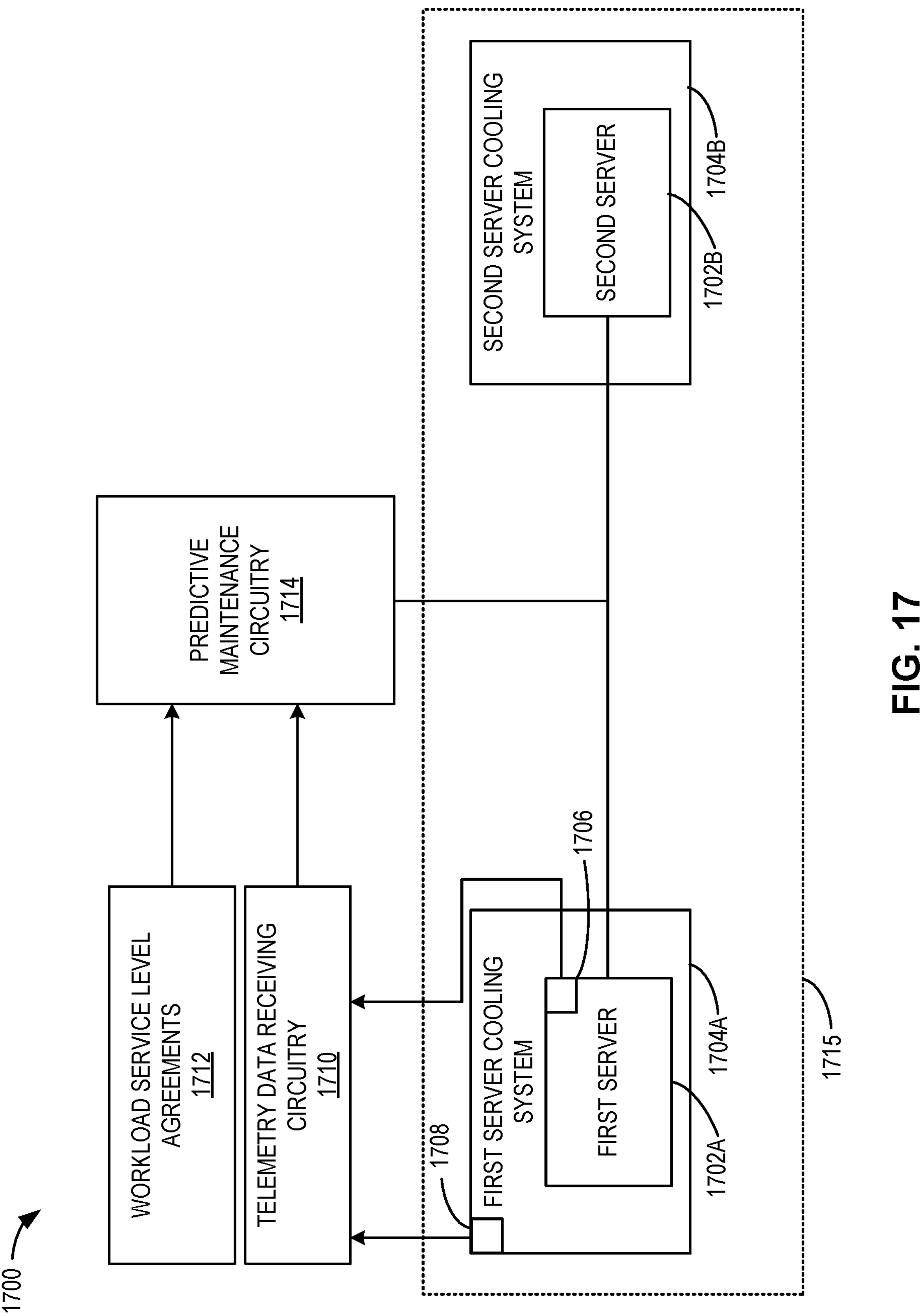
FIG. 17 is a block diagram of an example system implemented in accordance with teachings of this disclosure.

FIG. 17 illustrates an example system 1700 implemented in accordance with the teachings of this disclosure. In the illustrated example of FIG. 17, the system 1700 includes an example first server 1702A, an example second server 1702B, an example first cooling system 1704A, and an example second cooling system 1704B. In the illustrated example of FIG. 17, the first server 1702A includes example first sensors 1706 and the first cooling system 1704A includes example second sensors 1708. The first sensors 1706 and the second sensors 1708 provide telemetry data to an example telemetry data receiving circuitry 1710. In the illustrated example of FIG. 17, data from the telemetry data receiving circuitry 1710 and workload service level agreements (SLAs) 1712 provide input to example predictive maintenance circuitry 1714. The example system 1700 provides for the determination of the health of the first server 1702A, the scheduling of maintenance thereof, and the management of load thereon.

The servers 1702A, 1702B each include a plurality of heat-generating compute components (e.g., memory, central processing units, graphical processing units, accelerators, mass storage, network interface controllers, etc.). In some examples, the compute components can be carried by one or more chassis, which can be supported by an appliance (e.g., a rack, etc.). In the illustrated example of FIG. 17, the first server 1702A uses these compute components to execute one or more workloads in a manner governed by the workload SLAs 1712. In some examples, over time and/or operation, these components of the servers 1702A, 1702B degrade, which can cause component failure and/or performance degradation. As such, the servers 1702A, 1702B must be periodically serviced to replace and/or maintained degraded compute components of the servers 1702A, 1702B. In the illustrated example of FIG. 17, the system 1700 includes two servers 1702A, 1702B. In other examples, the system 1700 can include any number of servers (e.g., one, three, four, fifty, etc.). The example servers of the system 1700 (e.g., the servers 1702A, 1702B, etc.) can include and/or be implemented by any of the example devices described above in connection with FIGS. 2-16, including the managed node 1670 of FIG. 16.

In the illustrated example of FIG. 17, the servers 1702A, 1702B are disposed in an example remote environment 1715. The remote environment 1715 can be a marine environment (e.g., a deep sea environment, a remote oceanic environment, etc.), a deep Earth environment (e.g., in a mine, in a cave, etc.), a remote wilderness environment, a high altitude environment, a space-based environment, etc. In other examples, the second server 1702B can be located in a different environment than the first server 1702A. For example, the first server 1702A can be disposed in the remote environment 1715 and the second server 1702B can be disposed in another environment (e.g., a data center, etc.) In other examples, the first server 1702A and/or second server 1702B can be disposed in any other suitable environment(s) (e.g., non-remote environment(s) etc.). In some examples, the remote environment 1715 makes servicing (e.g., performing maintenance on, etc.) the first server 1702A and/or the second server 1702B difficult, hazardous, and/or costly. For example, the remote environment 1715 can require technicians servicing the first server 1702A to have special training and/or special equipment. Additionally or alternatively, accessing the remote environment 1715 can be time extensive (e.g., requiring a comparatively great amount of travel time, etc.). In the illustrated example of FIG. 17, the predictive maintenance circuitry 1714 and the telemetry data receiving circuitry 1710 are not disposed in the remote environment 1715. In some such examples, one or both of the predictive maintenance circuitry 1714 and the telemetry data receiving circuitry 1710 can be implemented at a data center, as cloud-based implementations, as edge devices, and/or at any other suitable location. In other examples, one or both of the predictive maintenance circuitry 1714 and the telemetry data receiving circuitry 1710 can be disposed within the remote environment 1715 and/or implemented (e.g., fully implemented, partially implemented, etc.) by the first server 1702A and/or the second server 1702B.

The cooling systems 1704A, 1704B are associated with the servers 1702A, 1702B, respectively. While executing workloads, the components of the first server 1702A generate heat. In the illustrated example of FIG. 17, the first cooling system 1704A dissipates heat from the components of the first server 1702A, and the second cooling system 1704B dissipates heat from the components of the second server 1702B. In some examples, the cooling systems 1704A, 1704B can be different types of cooling systems. For example, the first cooling system 1704A can be implemented (e.g., fully implemented, partially implemented, etc.) by an liquid-based cooling system (e.g., a cold-plate liquid cooling system, a single-phase immersion cooling system, a two-phase immersion cooling system, etc.), and the second cooling system 1704B can be implemented (e.g., fully implemented, partially implemented, etc.) by an air-based cooling system. Like the compute components of the first server 1702A, the components of the first cooling system 1704A degrade over time and/or operation, which can cause efficacy reductions and/or the failure of the first cooling system 1704A. For example, the sensors 1708, the immersion fluid of the first cooling system 1704A, and/or other components of the first cooling system 1704A (e.g., pumps, etc.) may need to be periodically replaced, cleaned, and/or replenished, etc.

The first sensors 1706 include sensors that measure and output signals relating to the coolant in the first server 1702A. For example, the first sensors 1706 can include one or more temperature sensors that measure and output signals corresponding to the temperature of the compute components of the first server 1702A. In some such examples, the first sensors 1706A can include one or more thermocouple(s), one or more resistance temperature detector(s), one or more thermistor(s), one or more infrared optical sensor(s), and/or one or more semiconductor-based sensors. In some examples, the first sensors 1706 can measure the performance and/or health of the compute components. Additionally or alternatively, the first sensors 1706 can include any other suitable sensors that output signals reflective of a cooling capability of the coolant in the first server 1702A. In some examples, some or all of the first sensors 1706 can be disposed (e.g., partially disposed, fully disposed, etc.) in integrated circuit package(s) associated with the first server 1702A.

The second sensors 1708 include sensors that measure and output signals relating to the coolant in the first cooling system 1704A and/or the components of the first cooling system 1704A. For example, the second sensors 1708 can include one or more temperature sensors that measure and output signals corresponding to the coolant stored therein. In some such examples, the second sensors 1708 can include one or more thermocouple(s), one or more resistance temperature detector(s), one or more thermistor(s), one or more infrared optical sensor(s), and/or one or more semiconductor-based sensors. In some examples, the second sensors 1708 can include one or more fill-level sensors and/or fluid volume sensors that measure and output signals corresponding to the amount of coolant stored in the first server 1702A. In some such examples, the second sensors 1708 can include one or more capacitive fill-level sensors, one or more mechanical fill-level sensors (e.g., float sensors, etc.), one or more optical sensor(s), etc. Additionally or alternatively, the second sensors 1708 can include any other suitable sensors that output signals reflective of a cooling capability of the coolant in the first servers 1702A (e.g., sensors that measure particulate levels in the coolant, sensors that measure contamination of the coolant, etc.). In some examples, the second sensors 1708 are disposed (e.g., partially disposed, fully disposed, etc.) in an integrated circuit package associated with the first server 1702A and/or the first cooling system 1704A. Additionally or alternatively, the second sensors 1708 are disposed (e.g., partially disposed, fully disposed, etc.) in the flow path of the coolant in the first server 1702A.

In the example of FIG. 17, the signals output by the first sensors 1706 and the second sensors 1708 are transmitted to the telemetry data receiving circuitry 1710. For example, the first sensors can transmit runtime measurements of the temperature (e.g., average temperature, etc.). and/or performance of the components of the first server 1702A. For example, the second sensors 1708 can transmit runtime measurements of the temperature(s), fill-level, and/or material properties of the immersion fluid of the first cooling system 1704A (e.g., via a wired connection, via a wide area network (WAN), via a local area network (LAN), via the Internet, via a cellular network, etc.). The telemetry data receiving circuitry 1710 accesses the data from the sensors 1706, 1708 and stores the telemetry data in a database (not illustrated).

The workload service level agreements 1712 include indications of the priority (e.g., low-priority workloads, high-priority workloads, etc.) and/or the terms of the workloads associated with the workload SLAs 1712. In some examples, the workload SLAs 1712 can be set via a contract between an operator of the servers 1702A, 1702B, and/or an entity requesting the execution of the workload. In other examples, the workload SLAs 1712 can be set by an operator of the servers 1702A, 1702B and/or be based on operational requirements. In some examples, the workload service level agreements 1712 are stored in one or more database(s) associated with the predictive maintenance circuitry 1714. In some examples, the workload service level agreements 1712 are used by the predictive maintenance circuitry 1714 to estimate the future load on the components of the first server 1702A.

The predictive maintenance circuitry 1714 receives data from the telemetry data receiving circuitry 1710 and the workload service level agreements 1712. In some examples, the predictive maintenance circuitry 1714 determines a health of the first cooling system 1704A, an age of the first cooling system 1704A, a health of the coolant of the first cooling system 1704A, an age of the coolant of the first cooling system 1704A, and/or the health of the first server 1702A. For example, the predictive maintenance circuitry 1714 can determine the health of the first server 1702A and/or the first cooling system 1704A as a remaining life/lifespan (e.g., a time, a number of processing cycles, an amount of possible heat that can be dissipated, etc.). Additionally or alternatively, the predictive maintenance circuitry 1714 can determine the health of the first server 1702A and/or the first cooling system 1704A as a maximum possible performance (e.g., a processing capacity, a heat dissipating rate capacity, etc.). In some examples, the predictive maintenance circuitry 1714 generates one or more thresholds associated with the first cooling system 1704A and/or the first server 1702A. For example, the threshold generated by the predictive maintenance circuitry 1714 can correspond to levels of degradation of the first server 1702A and/or the first cooling system 1704A.

In some examples, the predictive maintenance circuitry 1714 compares the health level of the first server 1702A and/or the first cooling system 1704A to the determined threshold(s). For example, the predictive maintenance circuitry 1714 can compare the health(s) of the first server 1702A and/or the first cooling system 1704A to one or more first threshold(s), corresponding to a first level of degradation. In some examples, to ensure the first server 1702A and/or the first cooling system 1704A can continue operating until the next upcoming maintenance period, the predictive maintenance circuitry 1714 can throttle lower priority workloads, identified via the workload SLAs 1712 if one or more of the first thresholds are satisfied. Additionally or alternatively, the predictive maintenance circuitry 1714 can compare the health(s) of the first server 1702A and/or the first cooling system 1704A to one or more second threshold(s), corresponding to a second level of degradation more severe than the first level of degradation. In some examples, if one or more of the second thresholds are satisfied, to ensure the first server 1702A and/or the first cooling system 1704A can continue operating until the next upcoming maintenance period, the predictive maintenance circuitry 1714 can migrate higher priority workloads, identified via the workload SLAs 1712, to the second server 1702B (e.g., a redundant server cooled via the second cooling system 1704B, etc.). In some examples, after the first server 1702A and the first cooling system 1704A have been serviced, the predictive maintenance circuitry 1714 can return the first server 1702A to normal operation.

In some examples, the predictive maintenance circuitry 1714 uses the workload SLAs 1712, the threshold comparisons, and/or the data received from the telemetry data receiving circuitry 1710 to schedule a maintenance period. As used herein, a "maintenance period" refers to a scheduled time (e.g., period, etc.) during which one or more technicians (e.g., a human, an automated drone, etc.) will service (e.g., replace parts, replenish depleted resources such as immersion fluid, clean, etc.) the first server 1702A and/or the first cooling system 1704A. For example, the predictive maintenance circuitry 1714 can schedule a maintenance period to ensure that multiple components can be replaced/replenished in a single visit. In some examples, the predictive maintenance circuitry 1714 can determine the maintenance windows of one or more of the components of the first server 1702A (e.g., compute components, etc.) and/or one or more of the components of the first cooling system 1704A (e.g., cooling components, etc.). As used herein, a "maintenance window" is a period of time (e.g., a window, etc.) in which a particular component of a system is to be replaced, replenished, and/or serviced. For example, a maintenance window for a CPU could be a period of time when the CPU is nearing the end of its life of the CPU (e.g., between 90% and 100% of the expected life indicated by the manufacturer, etc.) and/or when the CPU has reached a particularly performance degradation threshold. The maintenance window of other components can be similarly determined (e.g., a first maintenance window for a first component, a second maintenance window for a second maintenance window, etc.). Additionally or alternatively, the predictive maintenance circuitry 1714 can schedule a maintenance period based on the availability of a technician. In the illustrated example of FIG. 17, the predictive maintenance circuitry 1714 and the telemetry data receiving circuitry 1710 are implemented by separate devices. In other examples, the predictive maintenance circuitry 1714 and the telemetry data receiving circuitry 1710 can be implemented by a same device.

The telemetry data receiving circuitry 1710 and/or the predictive maintenance circuitry 1714 of FIG. 17 may be instantiated (e.g., creating an instance of, bring into being for any length of time, materialize, implement, etc.) by processor circuitry such as a central processing unit executing instructions. Additionally or alternatively, the telemetry data receiving circuitry 1710 and/or the predictive maintenance circuitry 1714 of FIG. 17 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 17 may, thus, be instantiated at the same or different times. Some or all of the circuitry may be instantiated, for example, in one or more threads executing concurrently on hardware and/or in series on hardware. Moreover, in some examples, some or all of the circuitry of FIG. 17 may be implemented by microprocessor circuitry executing instructions to implement one or more virtual machines and/or containers.

Thus, the example system 1700 of FIG. 17 provides managing the maintenance of the first server 1702A and/or the first cooling system 1704A. The example system 1700 decreases the number of required technician visits to the first server 1702A, minimizes the downtime of the first server 1702A, and ensures that the workloads to be executed by the first server 1702A are properly executed.

Figure 18:
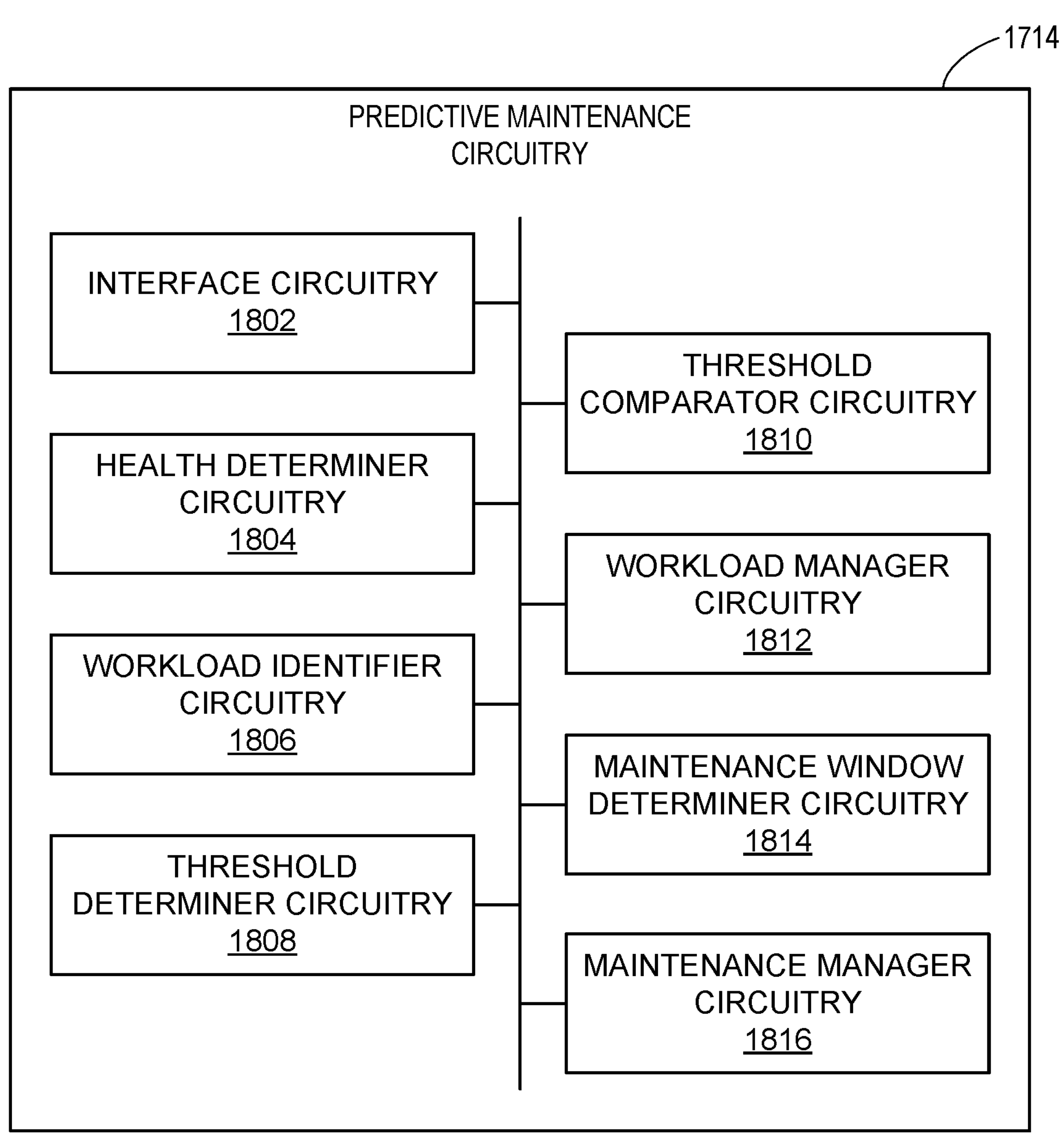
FIG. 18 is a block diagram of example predictive maintenance circuitry of the example system of FIG. 17.

FIG. 18 is a block diagram of the predictive maintenance circuitry 1714 to plan maintenance periods for compute systems and/or cooling systems to reduce (e.g., minimize)

system downtime and the number of technician visits. In the illustrated example of FIG. 18, the predictive maintenance circuitry 1714 includes example interface circuitry 1802, example health determiner circuitry 1804, example workload identifier circuitry 1806, example threshold determiner circuitry 1808, example threshold comparator circuitry 1810, example workload manager circuitry 1812, example maintenance window determiner circuitry 1814, and example maintenance manager circuitry 1816. The predictive maintenance circuitry 1714 of FIG. 17 may be instantiated (e.g., creating an instance of, bring into being for any length of time, materialize, implement, etc.) by processor circuitry such as a central processing unit executing instructions. Additionally or alternatively, the predictive maintenance circuitry 1714 of FIG. 18 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 18 may, thus, be instantiated at the same or different times. Some or all of the circuitry may be instantiated, for example, in one or more threads executing concurrently on hardware and/or in series on hardware. Moreover, in some examples, some or all of the circuitry of FIG. 18 may be implemented by microprocessor circuitry executing instructions to implement one or more virtual machines and/or containers.

The interface circuitry 1802 can receive telemetry data from the first sensors 1706 and the second sensors 1708 via the telemetry data receiving circuitry 1710. In some examples, the interface circuitry 1802 can, via the telemetry data receiving circuitry 1710, access data from the first sensors 1706 corresponding to runtime measurements of the temperature (e.g., average temperature, etc.) of the first server 1702A and/or performance of the components of the first server 1702A. In some examples, the interface circuitry 1802 can, via the telemetry data receiving circuitry 1710, access data from the second sensors 1708 corresponding to measurements of the temperature(s), fill-level, and/or material properties of the immersion fluid of the first cooling system 1704A. In some examples, the interface circuitry 1802 can transmit a request to the telemetry data receiving circuitry 1710 periodically for such telemetry data. In other examples, the interface circuitry 1802 can be in continuous communication with the telemetry data receiving circuitry 1710. Additionally or alternatively, the interface circuitry 1802 can access the telemetry data from a database populated by the telemetry data receiving circuitry 1710. In other examples, the interface circuitry 1802 can be in direct communication with some or all of the sensors 1706, 1708. In some examples, the interface circuitry 1802 can transform the received telemetry data from a machine-readable format (e.g., a voltage, a current, etc.) to a human-readable format (e.g., an integer, a string, etc.). In some examples, the interface circuitry 1802 is instantiated by processor circuitry executing interface circuitry instructions and/or configured to perform operations such as those represented by the flowchart of FIG. 19.

The health determiner circuitry 1804 determines the health of the first server 1702A and/or the first cooling system 1704A based on the telemetry data received from the telemetry data receiving circuitry 1710. For example, the health determiner circuitry 1804 can determine the health of the first server 1702A as a remaining life/lifespan (e.g., a time, a number of processing cycles, etc.) before an expected failure of one or more components of the first server 1702A. Additionally or alternatively, the health determiner circuitry 1804 can determine the health of the first server 1702A as a maximum possible performance (e.g., a processing capacity, etc.).

In some examples, the health determiner circuitry 1804 determines the health of individual components of the first server 1702A (e.g., a health of a first component of the first server 1702A, a health of a second component of the first server 1702A, a health of one or more CPU(s) of the first server 1702A, a health of one or more GPU(s) of the first server 1702A, a health one or more power supplies of the first server 1702A, a health of one or more memory(s) of the first server 1702A, etc.) and/or the first cooling system 1704A (e.g., a health of a first component of the first cooling system 1704A, a health of a second component of the first cooling system 1704A, a health of one or more pumps of the first cooling system 1704A, the immersion fluid of the first cooling system 1704A, a health of one or more fluid conduits of the first cooling system 1704A, etc.). In some such examples, the health determiner circuitry 1804 can determine the overall server health of the first server 1702A based on the health of the components of the first server 1702A (e.g., as an average of the component health(s), as a median of the component health(s), as a lowest of the of component health(s), etc.). In some examples, the health determiner circuitry 1804 determines the overall health of the first cooling system 1704A based on the health of the components of the first cooling system 1704A (e.g., as an average of the component health(s), as a median of the component health(s), as a lowest of the of component health(s), etc.).

In some examples, the health determiner circuitry 1804 determines an overall health of the system of the first server 1702A and/or the first cooling system 1704A. For example, the health determiner circuitry 1804 can determine the overall system health based on an average (e.g., a mean, a median, etc.) of the health of the first server 1702A and the health of the first cooling system 1704A. In other examples, the health determiner circuitry 1804 can determine the overall system health based on a lesser of the health of the first server 1702A and the health of the first cooling system 1704A. In some examples, the health determiner circuitry 1804 can be implemented via a machine learning model (e.g., a neural network, a regression model, a Bayesian model, etc.) that uses the received telemetry data to output a health of the first server 1702A and/or the first cooling system 1704A. In some such examples, the machine learning model can be trained via labeled training data. Additionally or alternatively, the health determiner circuitry 1804 can be implemented via a look-up table. In some examples, the health determiner circuitry 1804 is instantiated by processor circuitry executing health determiner instructions and/or configured to perform operations such as those represented by the flowchart of FIG. 19.

The workload identifier circuitry 1806 identifies the workload priorities based on the workload service level agreements 1712. For example, the workload identifier circuitry 1806 can identify workloads with higher workload priorities based on the operational obligations of the workloads within the workload service level agreements 1712. In some examples, the workload identifier circuitry 1806 can, via natural language processing, identify a priority level by analyzing the text of one or more of the workload service level agreements 1712. In other examples, the workload identifier circuitry 1806 can identify the priority of one or more of the workload service level agreements 1712 via a predefined field of the workload service level agreements 1712. In other examples, the workload identifier circuitry

1806 can query an operator of the first server 1702A, a user of the first server 1702A, and/or an operator of the predictive maintenance circuitry 1714 to determine the priorities of the workloads to be executed by the first server 1702A. In some examples, the workload identifier circuitry 1806 is instantiated by processor circuitry executing workload identifier instructions and/or configured to perform operations such as those represented by the flowchart of FIG. 19.

The threshold determiner circuitry 1808 determines the system threshold(s) based on the workload service level agreement 1712, queued workloads on the first server 1702A, the next scheduled workloads, and/or one or more other parameters. For example, the threshold determiner circuitry 1808 can determine one or more thresholds corresponding to certain amounts of system degradation of the first server 1702A and/or the first cooling system 1704A. In some examples, the threshold determiner circuitry 1808 can use the scheduled workloads to determine an expected processing load on the first server 1702A. In some such examples, the threshold determiner circuitry 1808 determines a first threshold corresponding to a level of degradation in which the first server 1702A will not be able to achieve target performance for the next queued workloads on the first server 1702A. In some such examples, the threshold determiner circuitry 1808 determines a second threshold corresponding to a level degradation more extensive than the first threshold in which the first server 1702A and/or the first cooling system 1704A is expected to fail in the immediate future (e.g., within an hour, within a day, within a week, etc.) in current operating conditions. In some examples, the threshold determiner circuitry 1808 is instantiated by processor circuitry executing threshold determiner instructions and/or configured to perform operations such as those represented by the flowchart of FIG. 19.

The threshold comparator circuitry 1810 compares the overall system health, the health of the first server 1702A, and/or the health of the first cooling system 1704A to the threshold(s) determined by the threshold determiner circuitry 1808. For example, the threshold comparator circuitry 1810 can determine if the health of the first server 1702A, the first cooling system 1704A, and/or the overall system do not satisfy (e.g., are less than, etc.) one or more of the threshold comparator circuitry 1810. In some examples, the threshold comparator circuitry 1810 is instantiated by processor circuitry executing threshold comparator instructions and/or configured to perform operations such as those represented by the flowchart of FIG. 19.

The workload manager circuitry 1812 manages the workloads on the first server 1702A. For example, if the threshold comparator circuitry 1810 determines that the overall system health, the health of the first server 1702A, and/or the health of the first cooling system 1704A do not satisfy one or more of the thresholds, the workload manager circuitry 1812 can modify the first server 1702A and/or the workload to be executed thereon. For example, if the threshold comparator circuitry 1810 determines one or more of the overall system health, the health of the first server 1702A, and/or the health of the first cooling system 1704A do not satisfy a first threshold (e.g., a first degradation threshold, a first system threshold, etc.), the workload manager circuitry 1812 can throttle the performance of the first server 1702A to reduce the heat generation of the first server 1702A and/or rate of system degradation of the first server 1702A. In some such examples, the workload manager circuitry 1812 can reduce a the processor speed, memory speed, and/or another hardware attribute of the first server 1702A to reduce the workload and strain on the first server 1702A and/or the first cooling system 1704A. Additionally or alternatively, if the threshold comparator circuitry 1810 determines one or more of the overall system health, the health of the first server 1702A, and/or the health of the first cooling system 1704A do not satisfy a second threshold, the workload manager circuitry 1812 can take any other actions to reduce the computing and/or thermal strain on the first server 1702A and/or the first cooling system 1704A including migrating some or all of the workload on the first server 1702A to the second server 1702B. In some examples, the workload manager circuitry 1812 is instantiated by processor circuitry executing workload manager instructions and/or configured to perform operations such as those represented by the flowchart of FIG. 19.

The maintenance window determiner circuitry 1814 determines the maintenance windows of various components of the first server 1702A and/or the first cooling system 1704A. For example, the maintenance window determiner circuitry 1814 can prompt one or more technicians (e.g., via a push notification, etc.) to indicate when they are available to service the first server 1702A and/or the first cooling system 1704A. Additionally or alternatively, the maintenance window determiner circuitry 1814 can determine the availability of one or more technicians by querying a database (e.g., a database that includes the schedule of the technicians, etc.). In some examples, technician availability can be based on the location of the first server 1702A. For example, the first server 1702A is located in a remote location (e.g., a deep sea location, in Earth's orbit, etc.), and technician availability can be based on the infrastructure and/or planned service missions.

The maintenance window determiner circuitry 1814 can determine the maintenance windows of the compute components of the first server 1702A and the cooling components of the first cooling system 1704A. For example, the maintenance window determiner circuitry 1814 can determine the maintenance windows of individual components of the first server 1702A and/or the first cooling system 1704A based on the component health(s) determined during the blocks 1904, 1906. In other examples, the maintenance window determiner circuitry 1814 can determine the maintenance window of the compute components of the first server 1702A and the cooling components of the first cooling system 1704A based on the age(s) of the compute components of the first server 1702A and the cooling components of the first cooling system 1704A and the expected life of those components. In some examples, the maintenance window determiner circuitry 1814 is instantiated by processor circuitry executing maintenance manager instructions and/or configured to perform operations such as those represented by the flowchart of FIG. 19.

The maintenance manager circuitry 1816 manages the scheduling of maintenance periods on the first server 1702A and/or the first cooling system 1704A. For example, the maintenance manager circuitry 1816 can determine if a maintenance period is to be scheduled based on if the threshold comparator circuitry 1810 determines one or more of the thresholds are not satisfied. Additionally or alternatively, the maintenance manager circuitry 1816 can determine if a maintenance period is to be scheduled based on when the previous maintenance period was implemented. For example, the maintenance manager circuitry 1816 can determine if the duration since the most recent maintenance period has exceeded a threshold duration (e.g., one month, three months, one year, etc.). In other examples, the maintenance manager circuitry 1816 can determine if maintenance is to be scheduled in any other suitable manner. If the maintenance manager circuitry 1816 determines maintenance is to be scheduled, the maintenance manager circuitry 1816 can schedule a maintenance period by notifying a technician and/or scheduling downtime on the first server 1702A and/or the first cooling system 1704A to enable such maintenance. For example, the maintenance manager circuitry 1816 can schedule a maintenance period based on the availability of a technician. Additionally or alternatively, the maintenance manager circuitry 1816 can schedule a maintenance period to ensure that as many individual compute components and/or cooling components can be replaced and/or replenished in a single maintenance period to avoid multiple maintenance periods in a short period. In some examples, the maintenance manager circuitry 1816 can schedule a maintenance period with a greater priority if one or more of the degradation thresholds have been satisfied. In some examples, the maintenance manager circuitry 1816 is instantiated by processor circuitry executing maintenance manager instructions and/or configured to perform operations such as those represented by the flowchart of FIG. 19.

In some examples, the predictive maintenance circuitry 1714 includes means for interfacing. For example, the means for interfacing may be implemented by the interface circuitry 1802. In some examples, the interface circuitry 1802 may be instantiated by processor circuitry such as the example processor circuitry 2012 of FIG. 20. For instance, the interface circuitry 1802 may be instantiated by the example microprocessor 2100 of FIG. 21 executing machine executable instructions such as those implemented by at least blocks 1902, 1910 of FIG. 19. In some examples, the interface circuitry 1802 may be instantiated by hardware logic circuitry, which may be implemented by an ASIC, XPU, or the FPGA circuitry 2200 of FIG. 22 structured to perform operations corresponding to the machine readable instructions. Additionally or alternatively, the interface circuitry 1802 may be instantiated by any other combination of hardware, software, and/or firmware. For example, the interface circuitry 1802 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for determining the health of a system. For example, the means for determining the health of a system may be implemented by the health determiner circuitry 1804. In some examples, the health determiner circuitry 1804 may be instantiated by processor circuitry such as the example processor circuitry 2012 of FIG. 20. For instance, the health determiner circuitry 1804 may be instantiated by the example microprocessor 2100 of FIG. 21 executing machine executable instructions such as those implemented by at least blocks 1904, 1906, 1908 of FIG. 19. In some examples, the health determiner circuitry 1804 may be instantiated by hardware logic circuitry, which may be implemented by an ASIC, XPU, or the FPGA circuitry 2200 of FIG. 22 structured to perform operations corresponding to the machine readable instructions. Additionally or alternatively, the health determiner circuitry 1804 may be instantiated by any other combination of hardware, software, and/or firmware. For example, the health determiner circuitry 1804 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for identifying the priority of a workload. For example, the means for identifying the priority of a workload may be implemented by the workload identifier circuitry 1806. In some examples, the workload identifier circuitry 1806 may be instantiated by processor circuitry such as the example processor circuitry 2012 of FIG. 20. For instance, the workload identifier circuitry 1806 may be instantiated by the example microprocessor 2100 of FIG. 21 executing machine executable instructions such as those implemented by at least block 1912 of FIG. 19. In some examples, the workload identifier circuitry 1806 may be instantiated by hardware logic circuitry, which may be implemented by an ASIC, XPU, or the FPGA circuitry 2200 of FIG. 22 structured to perform operations corresponding to the machine readable instructions. Additionally or alternatively, the workload identifier circuitry 1806 may be instantiated by any other combination of hardware, software, and/or firmware. For example, the workload identifier circuitry 1806 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for determining thresholds. For example, the means for determining thresholds may be implemented by the threshold determiner circuitry 1808. In some examples, the threshold determiner circuitry 180800 may be instantiated by processor circuitry such as the example processor circuitry 2012 of FIG. 20. For instance, the threshold determiner circuitry 1808 may be instantiated by the example microprocessor 2100 of FIG. 21 executing machine executable instructions such as those implemented by at least block 1914 of FIG. 19. In some examples, the threshold determiner circuitry 1808 may be instantiated by hardware logic circuitry, which may be implemented by an ASIC, XPU, or the FPGA circuitry 2200 of FIG. 22 structured to perform operations corresponding to the machine readable instructions. Additionally or alternatively, the threshold determiner circuitry 1808 may be instantiated by any other combination of hardware, software, and/or firmware. For example, the threshold determiner circuitry 1808 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for comparing health to a threshold. For example, the means for comparing health to a threshold may be implemented by the threshold comparator circuitry 1810. In some examples, the threshold comparator circuitry 1810 may be instantiated by processor circuitry such as the example processor circuitry 2012 of FIG. 20. For instance, the threshold comparator circuitry 1810 may be instantiated by the example microprocessor 2100 of FIG. 21 executing machine executable instructions such as those implemented by at least blocks 1916, 1920 of FIG. 19. In some examples, the threshold comparator circuitry 1810 may be instantiated by hardware logic circuitry, which may be implemented by an ASIC, XPU, or the FPGA circuitry 2200 of FIG. 22 structured to perform operations corresponding to the machine readable instructions. Additionally or alternatively, the threshold comparator circuitry 1810 be instantiated by any other combination of hardware, software, and/or firmware. For example, the threshold comparator circuitry 1810 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for managing a workload. For example, the means for managing a workload may be implemented by the workload manager circuitry 1812. In some examples, the workload manager circuitry 1812 may be instantiated by processor circuitry such as the example processor circuitry 2012 of FIG. 20. For instance, the workload manager circuitry 1812 may be instantiated by the example microprocessor 2100 of FIG. 21 executing machine executable instructions such as those implemented by at least blocks 1918, 1922 of FIG. 19. In some examples, the workload manager circuitry 1812 may be instantiated by hardware logic circuitry, which may be implemented by an ASIC, XPU, or the FPGA circuitry 2200 of FIG. 22 structured to perform operations corresponding to the machine readable instructions. Additionally or alternatively, the workload manager circuitry 1812 may be instantiated by any other combination of hardware, software, and/or firmware. For example, the workload manager circuitry 1812 be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for determining a maintenance window for a system. For example, the means for determining a maintenance window for a system may be implemented by the maintenance window determiner circuitry 1814. In some examples, the maintenance window determiner circuitry 1814 may be instantiated by processor circuitry such as the example processor circuitry 2012 of FIG. 20. For instance, the maintenance window determiner circuitry 1814 may be instantiated by the example microprocessor 2100 of FIG. 21 executing machine executable instructions such as those implemented by at least blocks 1926, 1928 of FIG. 19. In some examples, the maintenance window determiner circuitry 1814 may be instantiated by hardware logic circuitry, which may be implemented by an ASIC, XPU, or the FPGA circuitry 2200 of FIG. 22 structured to perform operations corresponding to the machine readable instructions. Additionally or alternatively, the maintenance window determiner circuitry 1814 be instantiated by any other combination of hardware, software, and/or firmware. For example, the maintenance window determiner circuitry 1814 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the predictive maintenance circuitry 1714 includes means for managing a maintenance of a system. For example, the means for managing a maintenance of a system may be implemented by the maintenance manager circuitry 1816. In some examples, the maintenance manager circuitry 1816 may be instantiated by processor circuitry such as the example processor circuitry 2012 of FIG. 20. For instance, the maintenance manager circuitry 1816 may be instantiated by the example microprocessor 2100 of FIG. 21 executing machine executable instructions such as those implemented by at least block 1930 of FIG. 19. In some examples, the maintenance manager circuitry 1816 may be instantiated by hardware logic circuitry, which may be implemented by an ASIC, XPU, or the FPGA circuitry 2200 of FIG. 22 structured to perform operations corresponding to the machine readable instructions. Additionally or alternatively, the maintenance manager circuitry 1816 be instantiated by any other combination of hardware, software, and/or firmware. For example, the maintenance manager circuitry 1816 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the predictive maintenance circuitry 1714 of FIG. 17 is illustrated in FIG. 18, one or more of the elements, processes, and/or devices illustrated in FIG. 18 may be combined, divided, re-arranged, omitted, eliminated, and/or implemented in any other way. Further, the example interface circuitry 1802, the example health determiner circuitry 1804, the workload identifier circuitry 1806, the threshold determiner circuitry 1808, the threshold comparator circuitry 1810, the workload manager circuitry 1812, the maintenance window determiner circuitry 1814, the maintenance manager circuitry 1816 and/or, more generally, the example predictive maintenance circuitry 1714 of FIG. 17, may be implemented by hardware alone or by hardware in combination with software and/or firmware. Thus, for example, any of the example interface circuitry 1802, the example health determiner circuitry 1804, the workload identifier circuitry 1806, the threshold determiner circuitry 1808, the threshold comparator circuitry 1810, the workload manager circuitry 1812, the maintenance window determiner circuitry 1814, the maintenance manager circuitry 1816, and/or, more generally, the example A1, could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit (s) (ASIC(s)), programmable logic device(s) (PLD(s)), and/or field programmable logic device(s) (FPLD(s)) such as Field Programmable Gate Arrays (FPGAs). Further still, the example predictive maintenance circuitry 1714 of FIG. 17 may include one or more elements, processes, and/or devices in addition to, or instead of, those illustrated in FIG. 18, and/or may include more than one of any or all of the illustrated elements, processes and devices.

Figure 19:
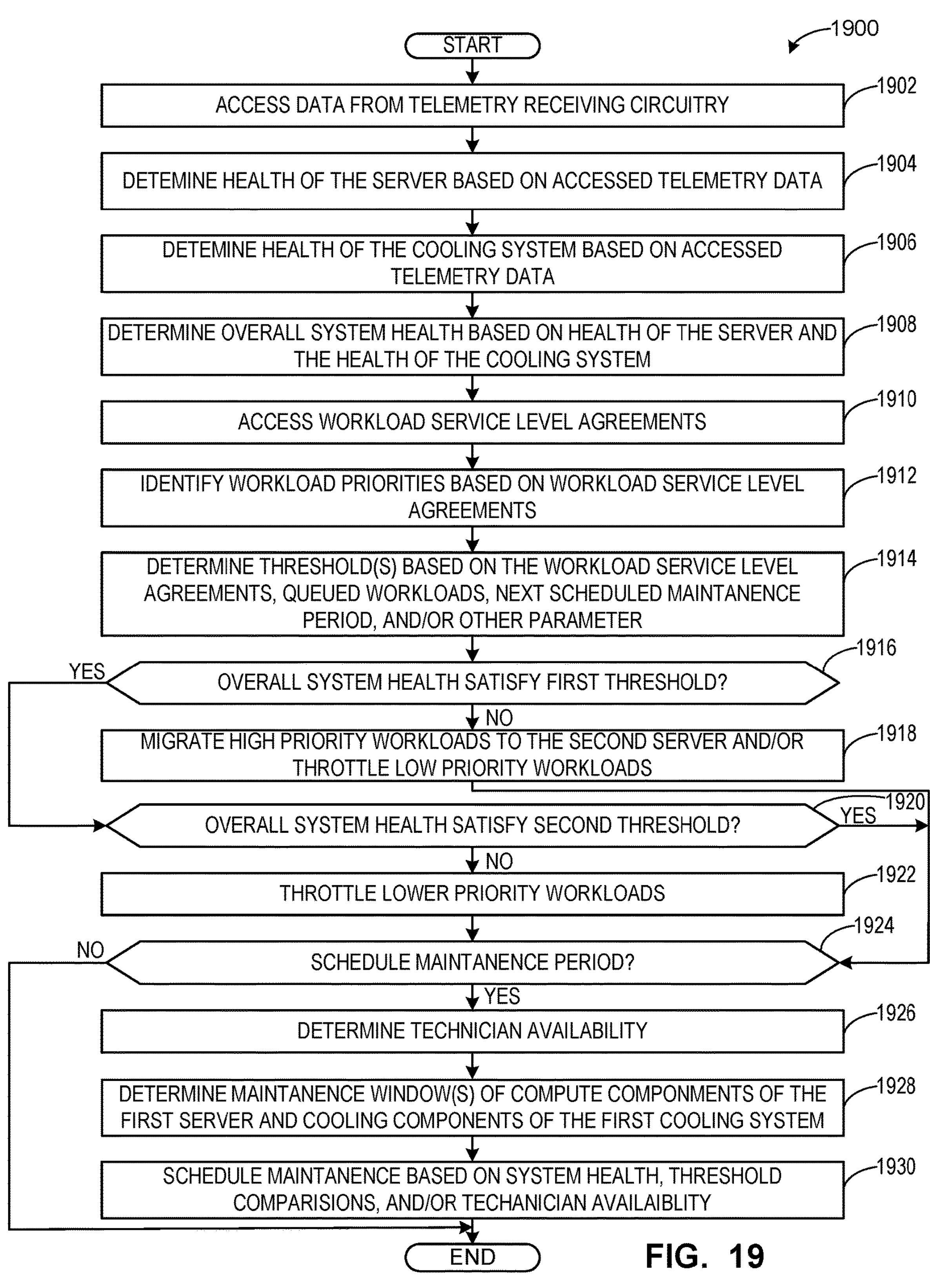
FIG. 19 is a flowchart representative of example machine readable instructions and/or example operations that may be executed by example processor circuitry to implement the predictive maintenance circuitry of FIG. 18.

A flowchart representative of example machine readable instructions, which may be executed to configure processor circuitry to implement the predictive maintenance circuitry 1714 of FIGS. 17 and 18 is shown in FIG. 19. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 19, many other methods of implementing the example predictive maintenance circuitry 1714 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations 1900 of FIG. 19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 19 is a flowchart representative of example machine readable instructions and/or example operations 1900 that may be executed and/or instantiated by processor circuitry to plan maintenance windows for compute systems and/or cooling systems to reduce (e.g., minimize) system downtime and the number of technician visits. The machine readable instructions and/or the operations 1900 of FIG. 19 begin at block 1902, at which the interface circuitry 1802 accesses data from the telemetry data receiving circuitry 1710. For example, the interface circuitry 1802 can receive telemetry data from the first sensors 1706 and the second sensors 1708 via the telemetry data receiving circuitry 1710. In some examples, the interface circuitry 1802 can, via the telemetry data receiving circuitry 1710, access data from the first sensors 1706 corresponding to runtime measurements of the temperature (e.g., average temperature, etc.) of the first server 1702A and/or performance of the components of the first server 1702A. In some examples, the interface circuitry 1802 can, via the telemetry data receiving circuitry 1710, access data from the second sensors 1708 corresponding to measurements of the temperature(s), fill-level, and/or material properties of the immersion fluid of the first cooling system 1704A. In some examples, the interface circuitry 1802 can transmit a request to the telemetry data receiving circuitry 1710 periodically (e.g., every five minutes, every hour, etc.) for such telemetry data. In other examples, the interface circuitry 1802 can be in continuous communication with the telemetry data receiving circuitry 1710. In some such examples, the telemetry data receiving circuitry 1710 can automatically transmit the telemetry data to the interface circuitry 1802 (e.g., continuously, at a predetermined interval, as the sensor data is received by the telemetry data receiving circuitry 1710, etc.). Additionally or alternatively, the interface circuitry 1802 can access the telemetry data from a database populated by the telemetry data receiving circuitry 1710. In other examples, the interface circuitry 1802 can be in direct communication with some or all of the sensors 1706, 1708. In some examples, the interface circuitry 1802 can transform the received telemetry data from a machine-readable format (e.g., a voltage, a current, etc.) to a human-readable format (e.g., an integer, a string, etc.).

At block 1904, the health determiner circuitry 1804 determines the health of the server based on the accessed telemetry data. For example, the health determiner circuitry 1804 can determine the health of the first server 1702A as a remaining life/lifespan (e.g., a time, a number of processing cycles, etc.) before an expected failure of one or more components of the first server 1702A. Additionally or alternatively, the predictive maintenance circuitry 1714 can determine the health of the first server 1702A as a maximum possible performance (e.g., a processing capacity, etc.). In some examples, the health determiner circuitry 1804 can determine the health of individual components of the first server 1702A (e.g., a health of one or more CPU(s) of the first server 1702A, a health of one or more GPU(s) of the first server 1702A, one or more power supplies of the first server 1702A, a health of one or more memory(s) of the first server 1702A, etc.). In some such examples, the health determiner circuitry 1804 can determine the overall server health of the first server 1702A based on the health of the components of the first server 1702A (e.g., as an average of the component health(s), as a median of the component health(s), as a lowest of the of component health(s), etc.). In some examples, the health determiner circuitry 1804 can determine the health of the first server 1702A via a machine learning model (e.g., a neural network, a regression model, a Bayesian model, etc.) that uses the received telemetry data to output a health of the first server 1702A. In some such examples, the machine learning model can be trained via labeled training data. Additionally or alternatively, the health determiner circuitry 1804 can be implemented via a look-up table.

At block 1906, the health determiner circuitry 1804 determines the health of the cooling system based on the accessed telemetry data. For example, the health determiner circuitry 1804 can determine the first cooling system 1704A as a remaining life/lifespan (e.g., a time, a number of processing cycles, an amount of possible heat that can be dissipated until failure, etc.). Additionally or alternatively, the health determiner circuitry 1804 can determine the health of the first cooling system 1704A as a maximum possible performance (e.g., a processing capacity, a heat dissipating rate capacity, etc.). Additionally or alternatively, the health determiner circuitry 1804 can determine a volume of immersion fluid within the first cooling system 1704A. In some examples, the health determiner circuitry 1804 can determine the health of the first cooling system 1704A via a machine learning model (e.g., a neural network, a regression model, a Bayesian model, etc.) that uses the received telemetry data to output a health of the first cooling system 1704A. In some such examples, the machine learning model can be trained via labeled training data. Additionally or alternatively, the health determiner circuitry 1804 can be implemented via a look-up table.

At block 1908, the health determiner circuitry 1804 determines the overall system health based on the health of the first server 1702A (determined at block 1904) and the health of the first cooling system 1704A (determined at block 1906). For example, the health determiner circuitry 1804 can determine the overall system health based on an average (e.g., a mean, a median, etc.) of the health of the first server 1702A and the health of the first cooling system 1704A. In other examples, the health determiner circuitry 1804 can determine the overall system health based on a lesser of the health of the first server 1702A and the health of the first cooling system 1704A. Additionally or alternatively, the health determiner circuitry 1804 can determine the overall system health in any other suitable manner.

At block 1910, the interface circuitry 1802 accesses the workload service level agreements 1712. For example, the interface circuitry 1802 can access the workload service level agreements 1712 from a database associated with the first server 1702A and/or a network of servers including the first server 1702A and/or the second server 1702B. In other examples, the interface circuitry 1802 can access the workload service level agreements 1712 from a client device utilizing the first server 1702A and/or the second server 1702B. At block 1912, the workload identifier circuitry 1806 identifies the workload priorities based on the workload service level agreements 1712. For example, the workload identifier circuitry 1806 can identify workloads with higher workload priorities based on the operational obligations of the workloads within the workload service level agreements 1712. In other examples, the workload identifier circuitry 1806 can identify the workload priorities in any other suitable manner.

At block 1914, the threshold determiner circuitry 1808 determines the system threshold(s) based on the workload service level agreement 1712, queued workloads on the first server 1702A, the next scheduled workloads, and/or one or more other parameters. For example, the threshold determiner circuitry 1808 can determine one or more thresholds corresponding to certain amounts of system degradation of the first server 1702A and/or the first cooling system 1704A. In some examples, the threshold determiner circuitry 1808 can use the scheduled workloads to determine an expected processing load on the first server 1702A. In some such examples, the threshold determiner circuitry 1808 determines a first threshold corresponding to a level degradation in which the first server 1702A will not be able to achieve target performance for the next queued workloads. In some such examples, the threshold determiner circuitry 1808 can determine a second threshold corresponding to a level degradation more extensive than the first threshold in which the first server 1702A and/or the first cooling system 1704A is expected to fail in the immediate future (e.g., within an hour, within a day, within a week, etc.) in current operating conditions.

At block 1916, the threshold comparator circuitry 1810 determines if the overall system health satisfies a first threshold of the determined thresholds. For example, the threshold comparator circuitry 1810 can compare the overall system health, determined during the execution of block 1908, to the first threshold determined during the execution of block 1914. If the threshold comparator circuitry 1810 determines the overall system health satisfies (e.g., meets or exceeds) the first threshold, the operations 1900 advance to block 1920. If the threshold comparator circuitry 1810 determines the overall system health does not satisfy (e.g., is below) the first threshold, the operations 1900 advance to block 1918.

If the threshold comparator circuitry 1810 determines the overall system health does not satisfy the first threshold, the workload manager circuitry 1812, as block 1918, migrates high-priority workloads to the second server and/or throttles low-priority workloads. For example, the workload manager circuitry 1812 can transfer a portion of the workload (e.g., 25% of the workload, 50% of the workload, all of the workload, etc.) on the first server 1702A to the second server 1702B to reduce the thermal and processor straining on the first cooling system 1704A and the first server 1702A, respectively. In some examples, the workload manager circuitry 1812 can throttle the remaining portion of the workload on the first server 1702A to reduce the workload and/or strain on the first server 1702A. For example, the workload manager circuitry 1812 can reduce the processor speed, memory speed, and/or another hardware attribute of the first server 1702A to reduce the strain on the first server 1702A and/or the first cooling system 1704A.

If the threshold comparator circuitry 1810 determines the overall system health satisfies the first threshold, the threshold comparator circuitry 1810, at block 1920, determines if the overall system health satisfies a second threshold of the determined thresholds. For example, the threshold comparator circuitry 1810 can compare the overall system health, determined during the execution of block 1908, to the second threshold determined during the execution of block 1914. If the threshold comparator circuitry 1810 determines the overall system health satisfies (e.g., meets or exceeds) the second threshold, the operations 1900 advance to block 1924. If the threshold comparator circuitry 1810 determines the overall system health does not satisfy (e.g., is below) the second threshold, the operations 1900 advance to block 1922.

If the threshold comparator circuitry 1810 determines the overall system health does not satisfy the second threshold, the workload manager circuitry 1812, at block 1922, throttles low-priority workloads. For example, the workload manager circuitry 1812 can reduce the processor speed, memory speed, and/or another hardware attribute of the first server 1702A to reduce the strain on the first server 1702A and/or the first cooling system 1704A. In some such examples, the workload manager circuitry 1812 can throttle the workload(s) on the first server 1702A to reduce the thermal output of the first server 1702A to a condition where the first cooling system 1704A can effectively cool the first server 1702A. In other examples, the workload manager circuitry 1812 can throttle the workload to any other suitable degree.

If the threshold comparator circuitry 1810 determines the overall system health satisfies the second threshold, the maintenance manager circuitry 1816, at block 1924, determines if a maintenance period of the first server 1702 is to be scheduled. For example, the maintenance manager circuitry 1816 can determine if a maintenance period is to be scheduled based on if one or more of the thresholds were satisfied during the execution of blocks 1916, 1920. Additionally or alternatively, the maintenance manager circuitry 1816 can determine if maintenance is to be scheduled based on when the previous maintenance period occurred. For example, the maintenance manager circuitry 1816 if the duration since the most recent maintenance period has exceeded a threshold duration (e.g., one month, three months, one year, etc.). In other examples, the maintenance manager circuitry 1816 can determine if a maintenance period is to be scheduled in any other suitable manner. If the maintenance manager circuitry 1816 determines a maintenance period is to be scheduled, the operations 1900 advance to block 1926. If the maintenance manager circuitry 1816 determines a maintenance period is not to be scheduled, the operations 1900 end.

At block 1926, the maintenance window determiner circuitry 1814 determines technician availability. For example, the maintenance window determiner circuitry 1814 can prompt one or more technicians (e.g., via a push notification, etc.) to indicate when they are available to service the first server 1702A and/or the first cooling system 1704A. Additionally or alternatively, the maintenance window determiner circuitry 1814 can determine the availability of one or more technicians by querying a database (e.g., a database that includes the schedule of the technicians, etc.). In some examples, technician availability can be based on the location of the first server 1702A. For example, the first server 1702A is located in a remote location (e.g., a deep sea location, in Earth's orbit, etc.), and technician availability can be based on the infrastructure and/or planned service missions. In other examples, the maintenance window determiner circuitry 1814 can determine technician availability in any other suitable manner.

At block 1928, the maintenance window determiner circuitry 1814 determines the maintenance windows of the compute components of the first server 1702A and the cooling components of the first cooling system 1704A. For example, the maintenance window determiner circuitry 1814 can determine the maintenance windows of individual components of the first server 1702A and/or the first cooling system 1704A based on the component health(s) determined during the blocks 1904, 1906. In other examples, the maintenance window determiner circuitry 1814 can determine the maintenance window of the compute components of the first server 1702A and the cooling components of the first cooling system 1704A based on the age(s) of the compute components of the first server 1702A and the cooling components of the first cooling system 1704A and the expected life of those components. In other examples, the maintenance window determiner circuitry 1814 can determine the maintenance window of the compute components in any other suitable manner.

At block 1930, the maintenance manager circuitry 1816 schedule maintenance based on the system health, threshold comparisons, and/or technician availability. For example, the maintenance manager circuitry 1816 can schedule a maintenance period based on the availability of a technician. Additionally or alternatively, the maintenance manager circuitry 1816 can schedule a maintenance period to ensure that as many individual compute components and/or cooling components can be replaced and/or replenished in a single maintenance period to avoid multiple technician visits in a short period. In some examples, the maintenance manager circuitry 1816 can schedule a maintenance period with a greater priority if one or more of the degradation thresholds have been satisfied. In other examples, the maintenance manager circuitry 1816 can schedule the maintenance period at any other suitable time. After block 1930, the operations 1900 end. The example operations of 1900 can be repeated any number of times.

Figure 20:
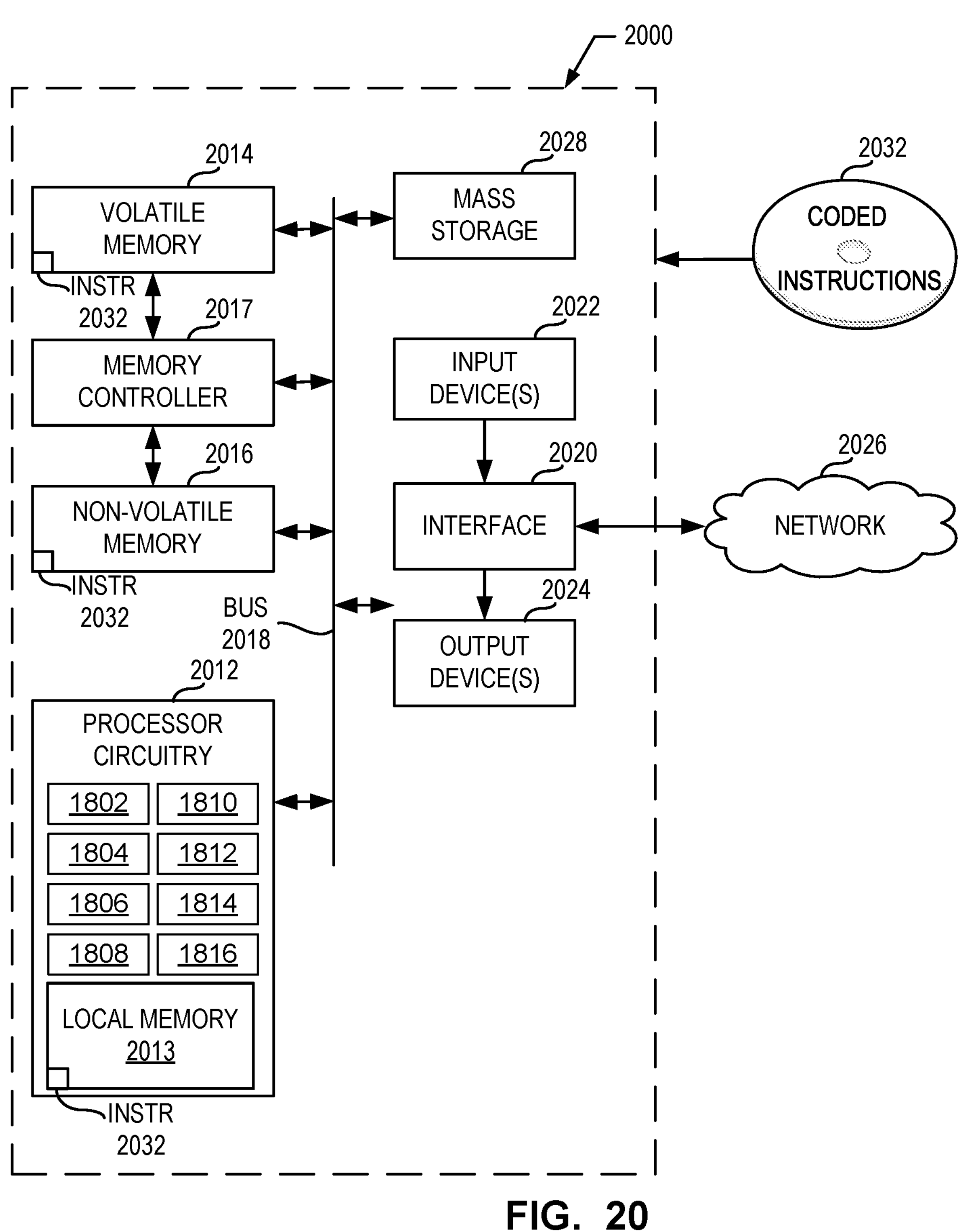
FIG. 20 is a block diagram of an example processing platform including processor circuitry structured to execute example machine readable instructions and/or example operations of FIG. 19 to implement the circuitry of the example predictive maintenance circuitry of FIG. 18.

FIG. 20 is a block diagram of an example processor platform 2000 structured to execute and/or instantiate machine readable instructions and/or operations to implement the circuitry of the example system 1700 of FIG. 17. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) devices. In this example, the processor circuitry 2012 includes the interface circuitry 1802, the health determiner circuitry 1804, the workload identifier circuitry, the threshold determiner circuitry 1808, the threshold comparator circuitry 1810, the workload manager circuitry 1812, the maintenance window determiner circuitry 1814, and the maintenance manager circuitry 1816.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2022 are connected to the interface circuitry 2020. The input device(s) 2022 permit(s) a user to enter data and/or commands into the processor circuitry 2012. The input device(s) 2022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuitry 2020 of the illustrated example. The output device(s) 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

Machine readable instructions 2032 may be stored in the mass storage device 2028, in the volatile memory 2014, in the non-volatile memory 2016, and/or on a removable non-transitory computer readable storage medium such as a CD or DVD.

Figure 21:
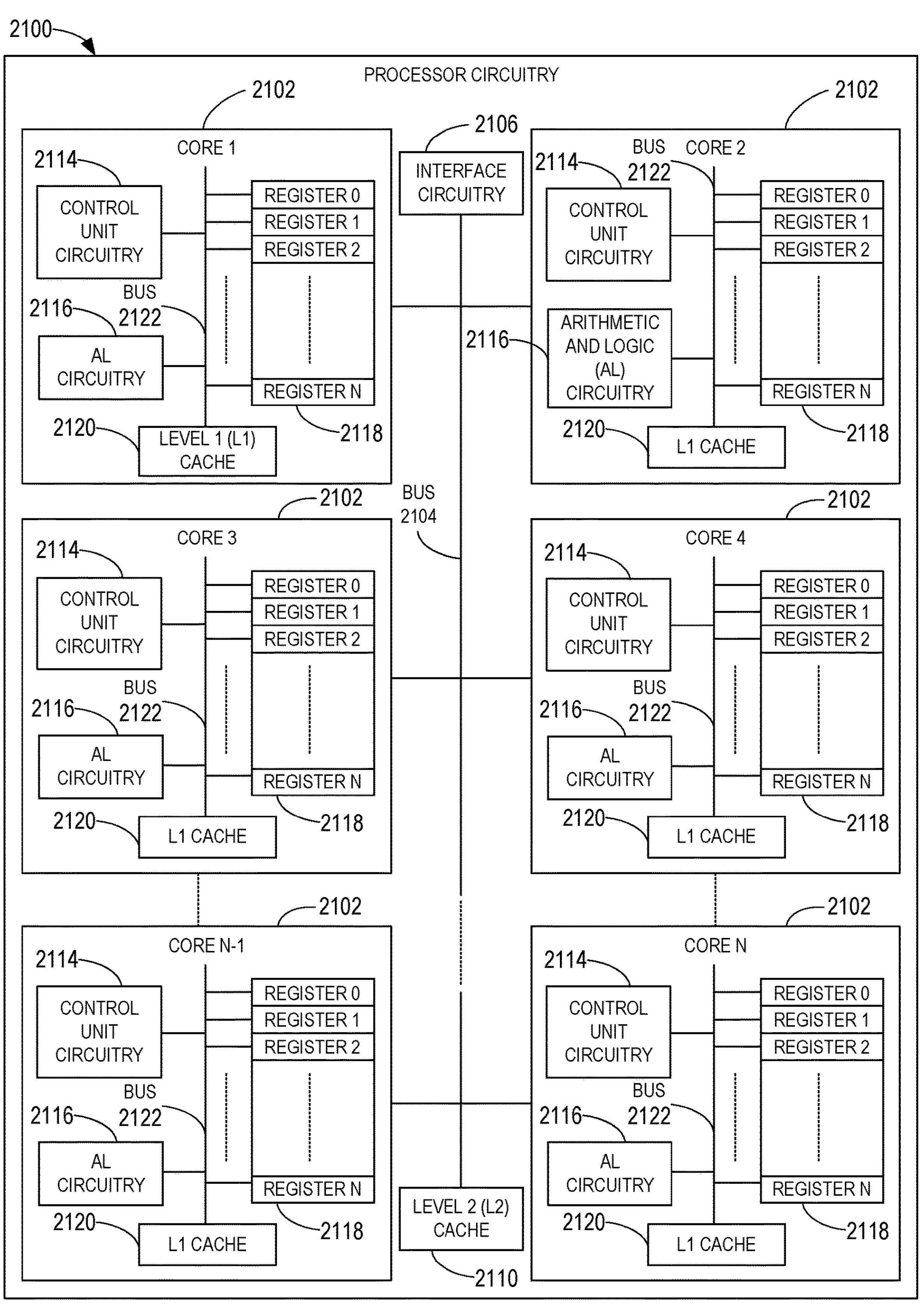
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may be a general purpose microprocessor (e.g., general purpose microprocessor circuitry). The microprocessor 2100 executes some or all of the machine readable instructions to effectively instantiate the circuitry of FIG. 17 as logic circuits to perform the operations corresponding to those machine readable instructions. In some such examples, the circuitry of NG. 17 is instantiated by the hardware circuits of the microprocessor 2100 in combination with the instructions. For example, the microprocessor 2100 may be implemented by multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations.

The cores 2102 may communicate by a first example bus 2104. In some examples, the first bus 2104 may be implemented by a communication bus to effectuate communication associated with one(s) of the cores 2102. For example, the first bus 2104 may be implemented by at least one of an Inter-Integrated Circuit (I2C) bus, a Serial Peripheral Interface (SPI) bus, a PCI bus, or a PCIe bus. Additionally or alternatively, the first bus 2104 may be implemented by any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2 cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the local memory 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The second bus 2122 may be implemented by at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
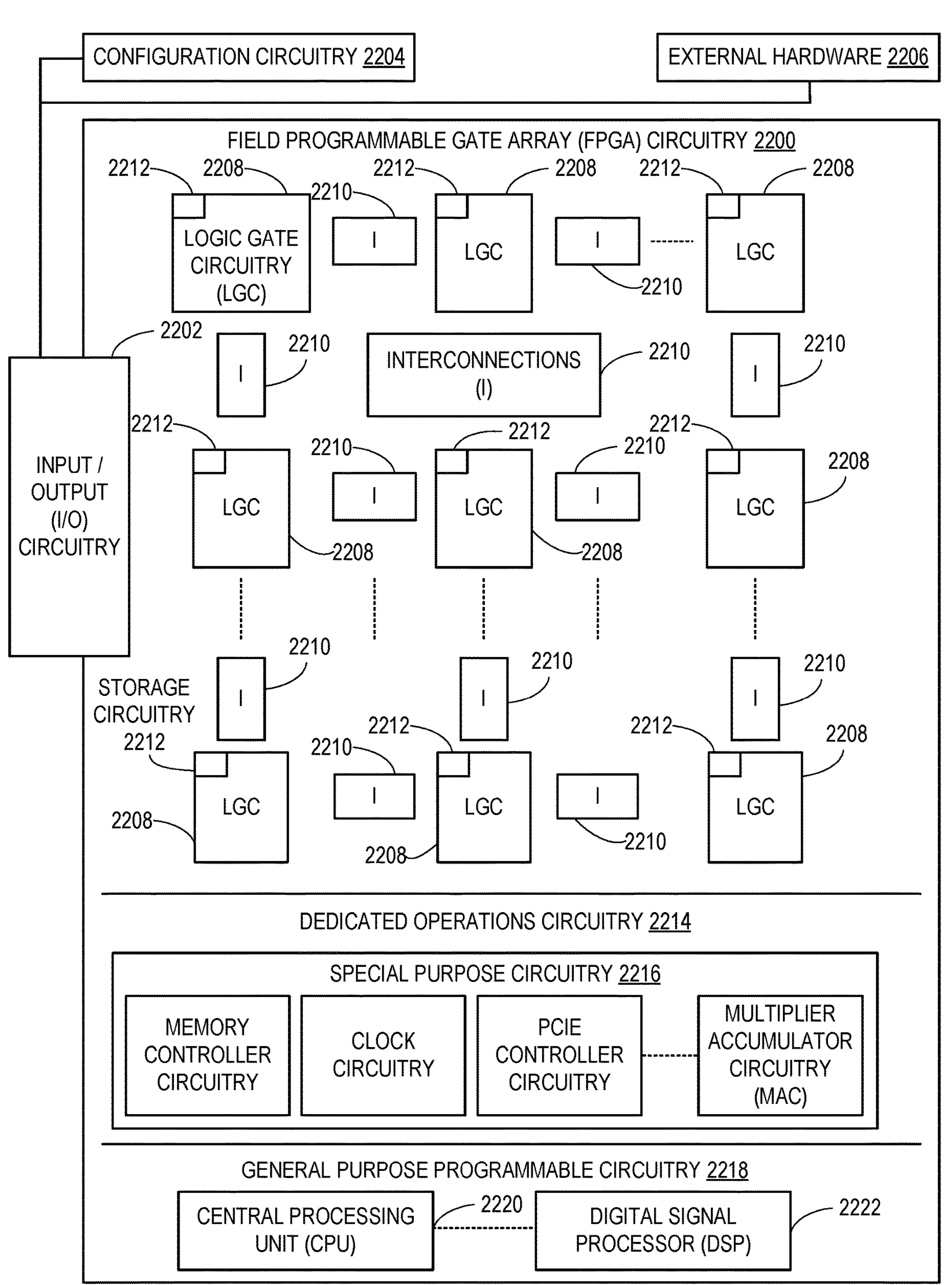
FIG. 22 is a block diagram of another example implementation of the processor circuitry of FIG. 20.

FIG. 22 is a block diagram of another example implementation of the processor circuitry 2012 of FIG. 20. In this example, the processor circuitry 2012 is implemented by FPGA circuitry 2200. For example, the FPGA circuitry 2200 may be implemented by an FPGA. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions. In particular, the FPGA circuitry 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software. As such, the FPGA circuitry 2200 may be structured to effectively instantiate some or all of the machine readable instructions as dedicated logic circuits to perform the operations corresponding to those software instructions in a dedicated manner analogous to an ASIC. Therefore, the FPGA circuitry 2200 may perform the operations corresponding to the some or all of the machine readable instructions faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware 2206. For example, the configuration circuitry 2204 may be implemented by interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may be implemented by external hardware circuitry. For example, the external hardware 2206 may be implemented by the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and the configurable interconnections 2210 are configurable to instantiate one or more operations that may correspond to at least some of the machine readable instructions and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The configurable interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 20 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions may be executed by one or more of the cores 2102 of FIG. 21, a second portion of the machine readable instructions may be executed by the FPGA circuitry 2200 of FIG. 22, and/or a third portion of the machine readable instructions may be executed by an ASIC. It should be understood that some or all of the circuitry of FIG. 17 may, thus, be instantiated at the same or different times. Some or all of the circuitry may be instantiated, for example, in one or more threads executing concurrently and/or in series. Moreover, in some examples, some or all of the circuitry of FIG. 17 may be implemented within one or more virtual machines and/or containers executing on the microprocessor.

In some examples, the processor circuitry 2012 of FIG. 20 may be in one or more packages. For example, the microprocessor 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that manage the maintenance of one or more servers.

The example system 1700 decreases the number of required technician visits to the first server 1702A, minimizes the downtime of the first server 1702A, and ensures that the workloads to be executed by the first server 1702A are properly executed. Disclosed systems, methods, apparatus, and articles of manufacture improve the efficiency of using a computing device by reducing the number of technician visits required to a server, minimizing the downtime of the servers, and ensures high-priority can continue to function. Examples disclosed herein improve the scheduling of maintenance of servers disposed in remote and/or isolated environments. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for maintaining the cooling systems of distributed compute systems are disclosed herein. Further examples and combinations thereof include the following:

Example 1 includes an apparatus comprising memory, machine-readable instructions, and processor circuitry to execute the machine-readable instructions to determine a health of a server, determine a threshold based on a workload service level agreement associated with the server, and in response to determining the health does not a satisfy the threshold, throttle a workload on the server.

Example 2 includes the apparatus of example 1, wherein the server is disposed in a marine environment, a deep Earth environment, or a high altitude environment.

Example 3 includes the apparatus of example 1, wherein the server is a first server, the threshold is a first threshold, and the processor circuitry is to execute the machine-readable instructions to determine a second threshold based on the workload service level agreement, and migrate the workload to a second server different than the first server.

Example 4 includes the apparatus of example 3, wherein the first server includes a liquid-based cooling system and the second server includes an air-based cooling system.

Example 5 includes the apparatus of example 1, wherein the server includes a cooling system and the processor circuitry is to execute the machine-readable instructions to determine the health of the server by determining a first component health of a compute component of the server, determining a second component health of a cooling component of the cooling system, and determining the health of the server based on the first component health and the second component health.

Example 6 includes the apparatus of example 5, in response to determining the health of the server does not satisfy the threshold, the processor circuitry is to execute the machine-readable instructions to determine a first maintenance window of the compute component based on the first component health, determine a second maintenance window of the cooling component based on the second component health, and schedule a maintenance period of the server, the maintenance period scheduled to be within the first maintenance window and the second maintenance window.

Example 7 includes the apparatus of example 5, wherein the processor circuitry is to execute the machine-readable instructions to determine the health of the server as a lesser one of the first component health and the second component health.

Example 8 includes a method comprising determining a health of a server, determining a threshold based on a workload service level agreement associated with the server, and in response to determining the health does not a satisfy the threshold, throttling a workload on the server.

Example 9 includes the method of example 8, wherein the server is located at of a marine environment, a deep Earth environment, or a high altitude environment.

Example 10 includes the method of example 8, wherein the server is a first server, the threshold is a first threshold, and the method further includes determining a second threshold based on the workload service level agreement, and migrating the workload to a second server different than the first server.

Example 11 includes the method of example 10, wherein the first server includes a liquid-based cooling system and the second server includes an air-based cooling system.

Example 12 includes the method of example 8, wherein the server includes a cooling system and the determination the health of the server includes determining a first component health of a compute component of the server, determining a second component health of a cooling component of the cooling system, and determining the health of the server based on the first component health and the second component health.

Example 13 includes the method of example 12, further including, in response to determining the health of the server does not satisfy the threshold determining a first maintenance window of the compute component based on the first component health, determining a second maintenance window of the cooling component based on the second component health, and scheduling a maintenance period of the server, the maintenance period scheduled to be within the first maintenance window and the second maintenance window.

Example 14 includes a non-transitory computer readable storage medium comprising machine-readable instructions, which when executed, caused one or more processors to determine a health of a server including a cooling system, determine a threshold based on a workload service level agreement associated with the server, and in response to determining the health does not a satisfy the threshold, throttle a workload on the server.

Example 15 includes the non-transitory computer readable storage medium of example 14, wherein the server is disposed in at least one of a marine environment, a deep Earth environment, or a high altitude environment.

Example 16 includes the non-transitory computer readable storage medium of example 14, wherein the server is a first server, the threshold is a first threshold, and the instructions, when executed, caused the one or more processors to execute the machine-readable instructions to determine a second threshold based on the workload service level agreement, and migrate the workload to a second server different than the first server.

Example 17 includes the non-transitory computer readable storage medium of example 16, wherein the first server includes a liquid-based cooling system and the second server includes an air-based cooling system.

Example 18 includes the non-transitory computer readable storage medium of example 14, wherein the instructions, when executed, caused the one or more processors to execute the machine-readable instructions to determine a first component health of a compute component of the server, determine a second component health of a cooling component of the cooling system, and determine the health of the server based on the first component health and the second component health.

Example 19 includes the non-transitory computer readable storage medium of example 18, wherein the instructions, when executed, caused the one or more processors to execute the machine-readable instructions to, in response to determining the health does not satisfy the threshold determine a first maintenance window of the compute component based on the first component health, determine a second maintenance window of the cooling component based on the second component health, and schedule a maintenance period of the server, the maintenance period scheduled to be within the first maintenance window and the second maintenance window.

Example 20 includes the non-transitory computer readable storage medium of example 18, wherein the instructions, when executed, caused the one or more processors to determine the health of the server as a lesser one of the first component health and the second component health.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
- memory;
- machine-readable instructions; and
- at least one processor circuit to execute the machine-readable instructions to:
- determine a first component health of a compute component of a server;
- determine a second component health of a cooling component of a cooling system for the server;
- determine a health of the server based on the first component health and the second component health;
- determine a threshold based on a workload service level agreement associated with the server; and
- in response to determining the health of the server does not a satisfy the threshold:
  - throttle a workload on the server;
  - determine a first maintenance window of the compute component based on the first component health;
  - determine a second maintenance window of the cooling component based on the second component health; and
  - schedule a maintenance period for the server, the maintenance period scheduled to be within the first maintenance window and the second maintenance window.

2. The apparatus of claim 1, wherein the server is disposed in a marine environment, a deep Earth environment, or a high altitude environment.

3. The apparatus of claim 1, wherein the server is a first server, the threshold is a first threshold, and one or more of the at least one processor circuit is to execute the machine-readable instructions to:
- determine a second threshold based on the workload service level agreement; and
- migrate the workload to a second server different than the first server.

4. The apparatus of claim 3, wherein the first server includes a liquid-based cooling system and the second server includes an air-based cooling system.

5. The apparatus of claim 1, wherein one or more of the at least one processor circuit is to execute the machine-readable instructions to determine the health of the server as a lesser one of the first component health and the second component health.

6. A method comprising:
- determining a first component health of a compute component of a server;
- determining a second component health of a cooling component of a cooling system for the server;
- determining a health of the server based on the first component health and the second component health;
- determining a threshold based on a workload service level agreement associated with the server; and
- in response to determining the health of the server does not a satisfy the threshold:
  - throttling a workload on the server;
  - determining a first maintenance window of the compute component based on the first component health;
  - determining a second maintenance window of the cooling component based on the second component health; and
  - scheduling, by executing instructions with at least one processor circuit, a maintenance period for the server, the maintenance period scheduled to be within the first maintenance window and the second maintenance window.

7. The method of claim 6, wherein the server is located at of in a marine environment, a deep Earth environment, or a high altitude environment.

8. The method of claim 6, wherein the server is a first server, the threshold is a first threshold, and the method further includes:

determining a second threshold based on the workload service level agreement; and migrating the workload to a second server different than the first server.

9. The method of claim 8, wherein the first server includes a liquid-based cooling system and the second server includes an air-based cooling system.

10. The method of claim 6, wherein the server is located in a deep sea environment.

11. The method of claim 6, wherein the server is located in a deep Earth environment.

12. The method of claim 6, wherein the server is located in a high altitude environment.

13. A non-transitory computer readable storage medium comprising machine-readable instructions to cause one or more processor circuits to:

determine a first component health of a compute component of a server;

determine a second component health of a cooling component of a cooling system for the server;

determine a health of the server including a cooling system based on the first component health and the second component health;

determine a threshold based on a workload service level agreement associated with the server; and in response to determining the health of the server does not a satisfy the threshold:

throttle a workload on the server;

determine a first maintenance window of the compute component based on the first component health;

determine a second maintenance window of the cooling component based on the second component health; and schedule a maintenance period for the server, the maintenance period scheduled to be within the first maintenance window and the second maintenance window.

14. The non-transitory computer readable storage medium of claim 13, wherein the server is disposed in at least one of a marine environment, a deep Earth environment, or a high altitude environment.

15. The non-transitory computer readable storage medium of claim 13, wherein the server is a first server, the threshold is a first threshold, and the instructions are to cause at least one of the one or more processor circuits to execute the machine-readable instructions to:

determine a second threshold based on the workload service level agreement; and migrate the workload to a second server different than the first server.

16. The non-transitory computer readable storage medium of claim 15, wherein the first server includes a liquid-based cooling system and the second server includes an air-based cooling system.

17. The non-transitory computer readable storage medium of claim 13, wherein the instructions are to cause at least one of the one or more processor circuits to determine the health of the server as a lesser one of the first component health and the second component health.

* * * * *